United States Patent
Neil et al.

(10) Patent No.: US 7,899,474 B2
(45) Date of Patent: Mar. 1, 2011

(54) ASSOCIATING A LABEL WITH A QUEUED MESSAGE AT A MOBILE DEVICE

(75) Inventors: Tim Neil, Mississauga (CA); Paul Chalmers, Windsor (CA); Steve Grenier, Georgetown (CA)

(73) Assignee: Research In Motion Limited, Waterloo, Ontario (CA)

( * ) Notice: Subject to any disclaimer, the term of this patent is extended or adjusted under 35 U.S.C. 154(b) by 945 days.

(21) Appl. No.: 11/465,579

(22) Filed: Aug. 18, 2006

(65) Prior Publication Data

US 2008/0045248 A1 Feb. 21, 2008

(51) Int. Cl.
- *H04W 4/12* (2009.01)
- *H04L 12/58* (2006.01)
- *H04L 29/08* (2006.01)

(52) U.S. Cl. ............... 455/466; 455/412.1; 455/414.4; 709/206

(58) Field of Classification Search ............ 455/466, 455/412.1–412.2, 413
See application file for complete search history.

(56) References Cited

U.S. PATENT DOCUMENTS

| | | | |
|---|---|---|---|
| 6,289,212 B1 * | 9/2001 | Stein et al. | 455/412.1 |
| 2003/0060896 A9 * | 3/2003 | Hulai et al. | 700/1 |
| 2004/0203670 A1 * | 10/2004 | King et al. | 455/414.3 |
| 2005/0153729 A1 * | 7/2005 | Logan et al. | 455/550.1 |
| 2006/0106779 A1 * | 5/2006 | Kim | 707/3 |
| 2007/0244926 A1 * | 10/2007 | Vitanov et al. | 707/104.1 |
| 2007/0249379 A1 * | 10/2007 | Bantukul | 455/466 |
| 2008/0020786 A1 * | 1/2008 | Smith et al. | 455/466 |
| 2008/0261564 A1 * | 10/2008 | Logan | 455/413 |
| 2008/0282155 A1 * | 11/2008 | Kempanna | 715/273 |

FOREIGN PATENT DOCUMENTS

| | | |
|---|---|---|
| EP | 1071029 A2 | 1/2001 |
| WO | WO 2004/055659 A1 | 1/2004 |

* cited by examiner

*Primary Examiner*—Nick Corsaro
*Assistant Examiner*—Tangela T. Chambers

(57) ABSTRACT

Responsive to the sensing of an occurrence of an event, an action may be executed according to which a message is generated. The message may be generated with a format that is based on an application definition document. According to the application definition document, a label may be generated for associating with the message. The message and label may then be stored in a queue in a manner that allows the label to be associated with the message. Subsequent to the message having been stored, a representation of the queue may be displayed for review by a user interested in the status of the message, or the queue in general. The label associated with the message is displayed in the representation rather than the actual code of the message, thereby allowing the viewer of the display to make an informed decision regarding further activity to carried out on the message.

20 Claims, 5 Drawing Sheets

ASSOCIATING A LABEL WITH A QUEUED MESSAGE AT A MOBILE DEVICE

COPYRIGHT NOTICE

A portion of the disclosure of this patent document contains material that is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

FIELD OF TECHNOLOGY

The present disclosure relates to storage of a message in a queue at a mobile communication device before transmission of the message and, more particularly, to the association of a label with the stored message.

BACKGROUND

A mobile communication device typically maintains a queue of outbound data to be sent to a destination. The data stored in the queue may, for instance, be messages destined for a server. Such messages may include messages that are formed as requests for information from the server and messages that are formed as updates to information previously stored on the server. Broadly, the messages may be considered elements of a data transaction between the server and the mobile device. Typically, the queue is used only in a transient manner while the mobile device is in coverage range. The queue is of particular use when the mobile device is not in communication with the server. That is, when the mobile device is not within a coverage range of any suitable wireless communications base stations. Typically, after being out of coverage range, when the mobile device enters a coverage range, the mobile device automatically sends the queued messages to the server.

Unfortunately, queuing may be required for extended periods. For instance, the mobile device may be out of coverage for the extent of a long journey aboard an airplane. By the time a given queued message is sent, the given queued message may be out of date.

A user of the mobile device may elect to inspect the queue and, thereby, determine, for example, that there are five outgoing messages in the queue. It is common that the outgoing messages are formatted in the known Extensible Markup Language (XML) or a variant thereof. As such, when the queue is inspected by the mobile device user, each outgoing message may be displayed in raw XML. This format may be difficult for an average mobile device user to comprehend. The situation may be compared to a network print queue in which items representing print jobs are undecipherable by a typical network user. As a result, the user may not understand the nature of the messages that are queued and may be ill-informed to re-attempt transmission or take other courses of action for urgent messages.

BRIEF DESCRIPTION OF THE DRAWINGS

In the figures which illustrate example embodiments of this application.

DETAILED DESCRIPTION

Each type of message to be transmitted from a mobile device may be defined to be associated with a label, where the label may provide a generic description (e.g., "New mail message", "Status update", etc.), to display when a message of that type is present in a queue of outbound messages. Responsive to the sensing of an occurrence of an event, a message is generated. The message may be generated with a format that is based on an application definition document. According to the application definition document, a label may be generated for associating with the message. The message and label may then be stored in a queue in a manner that allows the label to be associated with the message. Subsequent to the message having been stored, a representation of the queue may be displayed for review by a user interested in the status of the message, or the queue in general. The label associated with the message is displayed in the representation rather than the actual code of the message, thereby allowing the viewer of the display to make an informed decision regarding further activity to carried out on the message.

In accordance with an aspect of the present disclosure there is provided a method of handling outgoing messages. The method includes receiving a document that defines an explicit format for outgoing messages, said format including delimiters for defining the beginning and end of a message generated according to said format, and generating, according to the format, a message. The method further includes generating a label for the message based on information provided in the document, storing the message in a queue and storing the label in the queue associated with the message. In other aspects of the application, a mobile communication apparatus is provided to carry out the method and a computer readable medium is provided to allow a processor in a mobile communication device to carry out the method.

Other aspects and features of the present disclosure will become apparent to those of ordinary skill in the art upon review of the following description of specific embodiments of the application in conjunction with the accompanying figures.

Figure 1:
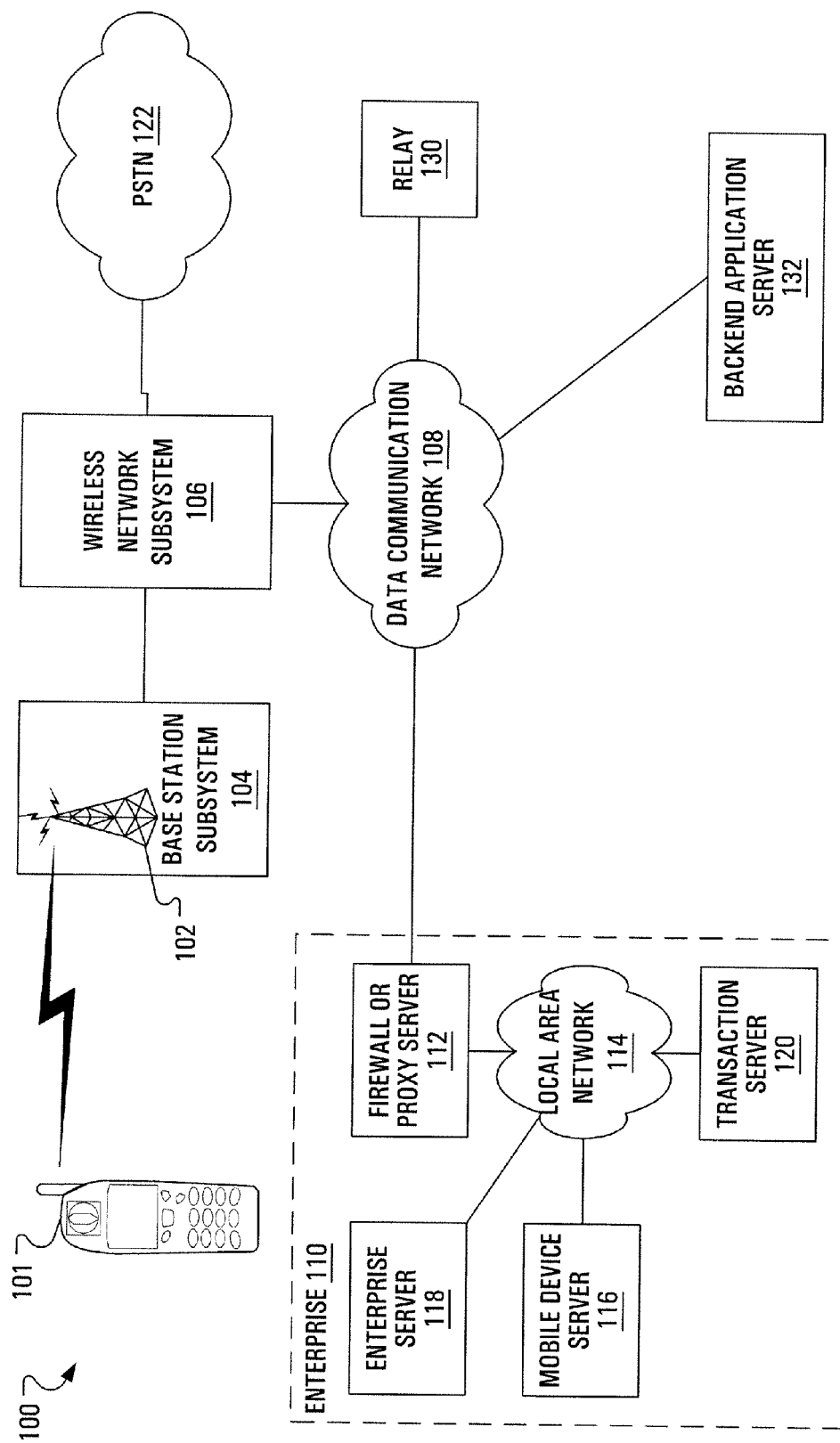
FIG. 1 illustrates elements of an exemplary network environment for a wireless mobile communication device.

FIG. 1 illustrates elements of an exemplary network environment 100 for a wireless mobile communication device 101. The elements of the exemplary network environment 100 include a wireless carrier core network subsystem 106 and a data communication network 108, which may be considered to represent at least one wide area network, such as the present day Internet and successors, as well as, potentially, multiple local area networks. A base station antenna 102, with which the mobile device 101 may communicate wirelessly, is provided as part of a base station subsystem 104.

The base station subsystem 104 communicates with the wireless core network subsystem 106. In an exemplary Global System for Mobile communications (GSM) implementation, the wireless core network subsystem 106 includes, among other components, a mobile services switching center, a home location register, a visitor location register and a Short Messaging Service Center. As illustrated in FIG. 1, the wireless core network subsystem 106 may be connected to the data communication network 108 and to a Public Switched Telephone Network (PSTN) 122.

The mobile device 101 may be associated with an enterprise 110 that is in communication with the data communication network 108. The enterprise 110 may, for instance, include a firewall or proxy server 112 connecting to the data communication network 108 and to a local area network (LAN) 114. The LAN 114 may allow communication between a mobile device server 116, an enterprise server 118 and a transaction server 120 within the enterprise.

Also connected to the data communication network 108 may be a relay 130 and a backend application server 132.

Figure 2:
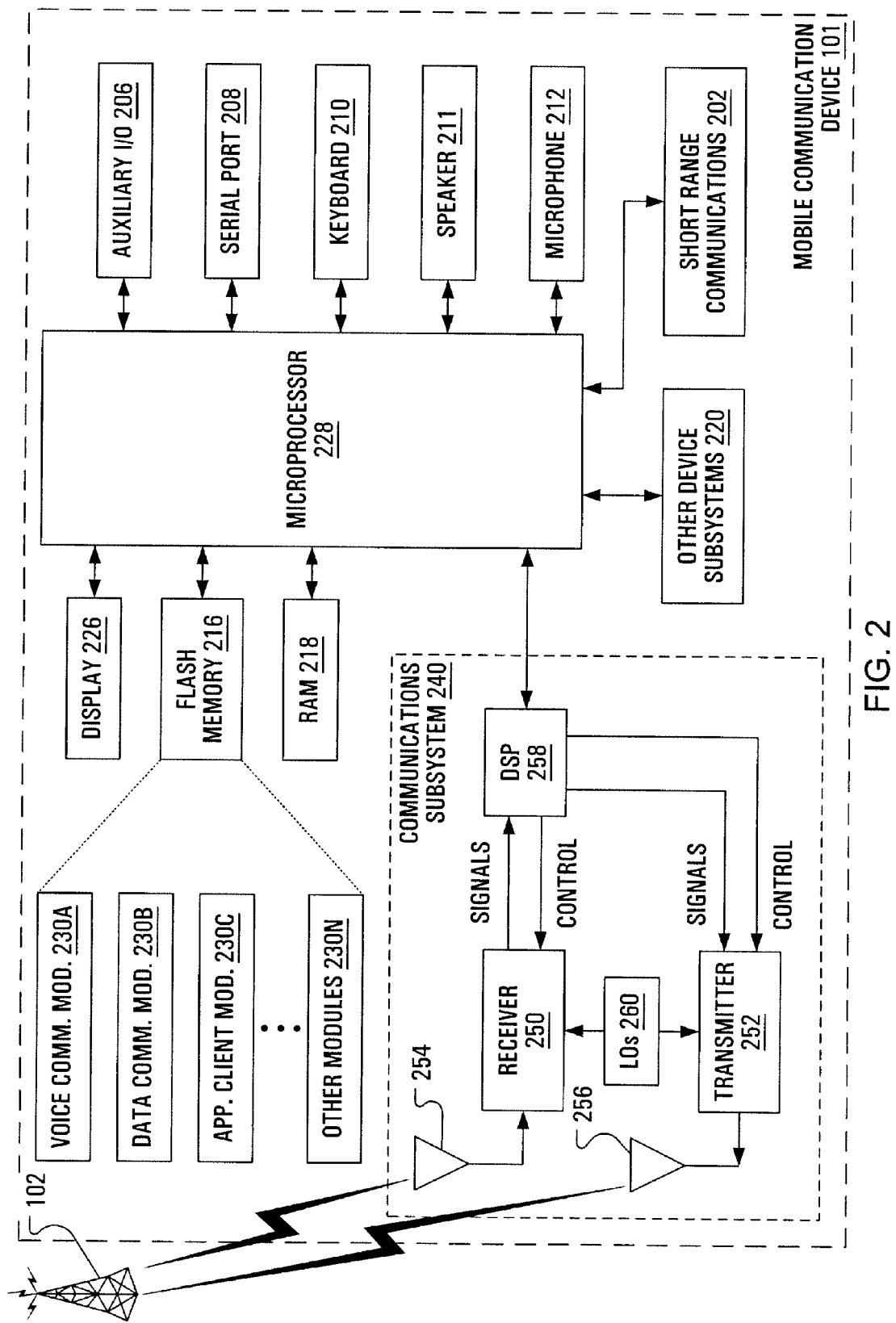
FIG. 2 illustrates, in greater detail, the wireless mobile communication device of FIG. 1 according to an embodiment of the present disclosure.

FIG. 2 illustrates the wireless mobile device 101 including a housing, an input device (a keyboard 210), and an output device (a display 226), which is preferably a full graphic or full color Liquid Crystal Display (LCD). Other types of output devices may alternatively be utilized. A processing device (a microprocessor 228) is shown schematically in FIG. 2 as coupled between the keyboard 210 and the display 226. The microprocessor 228 controls the operation of the display 226, as well as the overall operation of the mobile device 101, in response to actuation of keys on the keyboard 210 by a user.

The housing may be elongated vertically, or may take on other sizes and shapes (including clamshell housing structures). The keyboard 21 0 may include a mode selection key, or other hardware or software, for switching between text entry and telephony entry.

In addition to the microprocessor 228, other parts of the mobile device 101 are shown schematically in FIG. 2. These include: a communications subsystem 240; a short-range communications subsystem 202; the keyboard 210 and the display 226, along with other input/output devices including a set of auxiliary I/O devices 206, a serial port 208, a speaker 211 and a microphone 212; as well as memory devices including a persistent flash memory 216 and a Random Access Memory (RAM) 218; and various other device subsystems 220. The mobile device 101 is preferably a two-way radio frequency (RF) communication device having voice and data communication capabilities. In addition, the mobile device 101 preferably has the capability to communicate with other computer systems via the Internet.

Operating system software executed by the microprocessor 228 is preferably stored in a computer readable medium, such as the flash memory 216, but may be stored in other types of memory devices, such as a read only memory (ROM) or similar storage element. In addition, system software, specific device applications, or parts thereof, may be temporarily loaded into a volatile store, such as the RAM 218. Communication signals received by the mobile device 101 may also be stored to the RAM 218.

The microprocessor 228, in addition to its operating system functions, enables execution of software applications on the mobile device 101. A predetermined set of software applications that control basic device operations, such as a voice communications module 230A and a data communications module 230B, may be installed on the mobile device 101 during manufacture. An application client subsystem module 230C may also be installed on the mobile device 101 during manufacture, to implement aspects of the application. In particular, the application client subsystem module 230C may include virtual machine software.

Additional software modules, illustrated as an other software module 230N, which may be, for instance, a personal information manager (PIM) application, may be installed during manufacture. The PIM application is preferably capable of organizing and managing data items, such as e-mail messages, calendar events, voice mail messages, appointments, and task items. The PIM application is also preferably capable of sending and receiving data items via a wireless carrier network represented in FIG. 2 by the base station antenna 102. Preferably, the data items managed by the PIM application are seamlessly integrated, synchronized and updated via the wireless carrier network with the mobile device 101 user's corresponding data items stored at, or associated with, the enterprise server 118.

Communication functions, including data and voice communications, may be performed through the communication subsystem 240 and, possibly, through the short-range communications subsystem 202. The communication subsystem 240 includes a receiver 250, a transmitter 252 and one or more antennas, illustrated as a receive antenna 254 and a transmit antenna 256. In addition, the communication subsystem 240 also includes a processing module, such as a digital signal processor (DSP) 258, and local oscillators (LOs) 260. The specific design and implementation of the communication subsystem 240 is dependent upon the communication network in which the mobile device 101 is intended to operate. For example, the communication subsystem 240 of the mobile device 101 may be designed to operate with the Mobitex™, DataTAC™ or General Packet Radio Service (GPRS) mobile data communication networks and may also be designed to operate with any of a variety of voice communication networks, such as Advanced Mobile Phone Service (AMPS), Time Division Multiple Access (TDMA), Code Division Multiple Access (CDMA), Personal Communications Service (PCS), GSM, etc. Other types of data and voice networks, both separate and integrated, may also be utilized with the mobile device 101.

When the required network registration or activation procedures have been completed, the mobile device 101 may send and receive communication signals over the wireless carrier network. Signals received from the base station antenna 102 by the receive antenna 254 are routed to the receiver 250, which provides for signal amplification, frequency down conversion, filtering, channel selection, etc., and may also provide analog to digital conversion. Analog-to-digital conversion of the received signal allows the DSP 258 to perform more complex communication functions, such as demodulation and decoding. In a similar manner, signals to be transmitted to the base station antenna 102 are processed (e.g., modulated and encoded) by the DSP 258 and are then provided to the transmitter 252 for digital to analog conversion, frequency up conversion, filtering, amplification and transmission to the base station antenna 102 via the transmit antenna 256.

In addition to processing communication signals, the DSP 258 provides for control of the receiver 250 and the transmitter 252. For example, gains applied to communication signals in the receiver 250 and the transmitter 252 may be adaptively controlled through automatic gain control algorithms implemented in the DSP 258.

In a data communication mode, a received signal, such as an SMS message or web page download, is processed by the communication subsystem 240 and is input to the microprocessor 228. The received signal is then further processed by the microprocessor 228 in preparation for output to the display 226 or, alternatively, to some of the auxiliary I/O devices 206. A device user may also compose data items, such as e-mail messages or SMS messages, using the keyboard 210 and/or some other auxiliary I/O device 206, such as a touchpad, a rocker switch, a thumb-wheel, or some other type of input device. The composed data items may then be transmitted to the base station antenna 102 via the communication subsystem 240.

In a voice communication mode, overall operation of the mobile device 101 is substantially similar to the data communication mode, except that received signals may be output to the speaker 211, and signals for transmission may be generated by the microphone 212. Alternative voice or audio I/O subsystems, such as a voice message recording subsystem, may also be implemented on the mobile device 101. In addition, the display 226 may also be utilized in voice communication mode, for example, to display the identity of a calling party, the duration of a voice call, or other voice call related information.

The short-range communications subsystem 202 enables communication between the mobile device 101 and other proximate systems or devices, which need not necessarily be similar devices. For example, the short-range communications subsystem 202 may include an infrared device and associated circuits and components, or a Bluetooth™ communication module, to provide for communication with similarly-enabled systems and devices.

Figure 3:
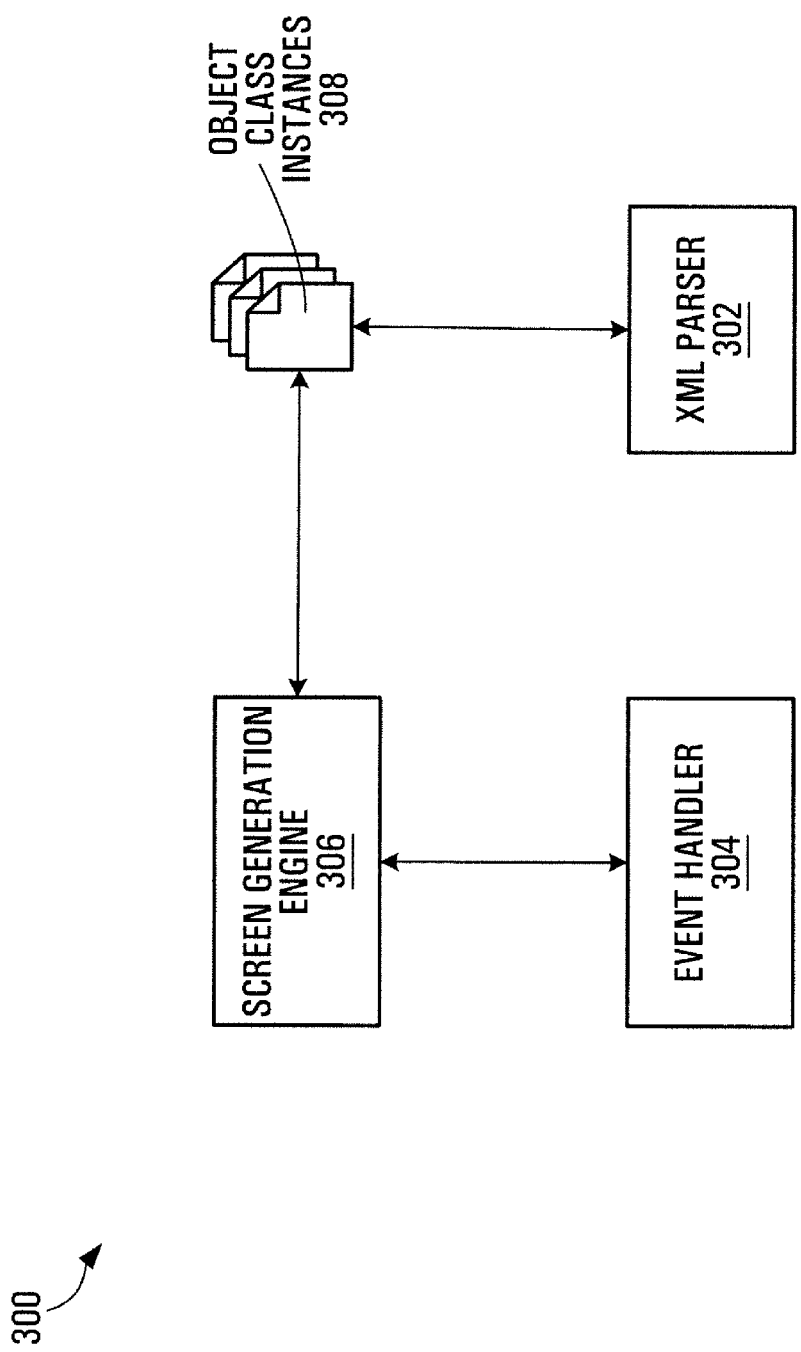
FIG. 3 illustrates elements of a virtual machine according to an embodiment of the present disclosure.

The virtual machine software of the application client subsystem module 230C may include: conventional XML parser software; event handler software; screen generation engine software; and object classes. The software, when executed, leads to a virtual machine 300, which, as illustrated in FIG. 3, includes: an XML parser 302; an event handler 304; a screen generation engine 306; and instances 308 of the object classes. The instances 308 correspond to XML elements supported by the virtual machine software and possibly other XML elements contained within an application definition document. Supported XML elements are detailed in Appendix A hereto attached. A person of ordinary skill will readily appreciate that those XML elements identified in Appendix A are exemplary only and may be extended or shortened as desired. An XML element is a form of markup language element.

From the perspective of the mobile device 101, the transaction server 120 is positioned behind the firewall 112. In operation, the transaction server 120 may exchange data traffic with the enterprise server 118. Additionally, the transaction server 120 may exchange data traffic with the backend application server 132. In an exemplary case, the virtual machine 300, executing on the microprocessor 228 of the mobile device 101, generates a request message and stores the request message in a queue of outbound messages. A message transmission object then transmits the request message to the transaction server 120, via the base station subsystem 104, the wireless network subsystem 106, the data communication network 108, the firewall 112 and the local area network 114. Responsive to receiving the request message, the transaction server 120 may execute a database query on a database. The response to the database query may, for instance, be an indication of server-side applications that are available to the mobile device 101. Data representative of the indication may then be transmitted, by the transaction server 120 in a response message, to the mobile device 101.

Upon receipt of the response message at the mobile device 101, the screen generation engine 306 of the virtual machine 300 may present a list of available server-side applications in a user interface on the display 226 of the mobile device 101. In response to being presented with the list of available server-side applications, a user at the mobile device 101 may select a given server-side application for which to register. Responsive to the user selecting the given server-side application, the virtual machine 300 generates a registration request message containing a registration request for the given server-side application and stores the registration request message in the outbound message queue. The message transmission object then transmits the registration request message to the transaction server 120. The transaction server 120, in response to receiving the registration request message, queries the server database for a user interface definition associated with the given server-side application and the mobile device 101. Thereafter, the transaction server 120 creates an application definition document, which includes the user interface definition, and transmits a message that includes the application definition document to the mobile device 101.

Figure 4:
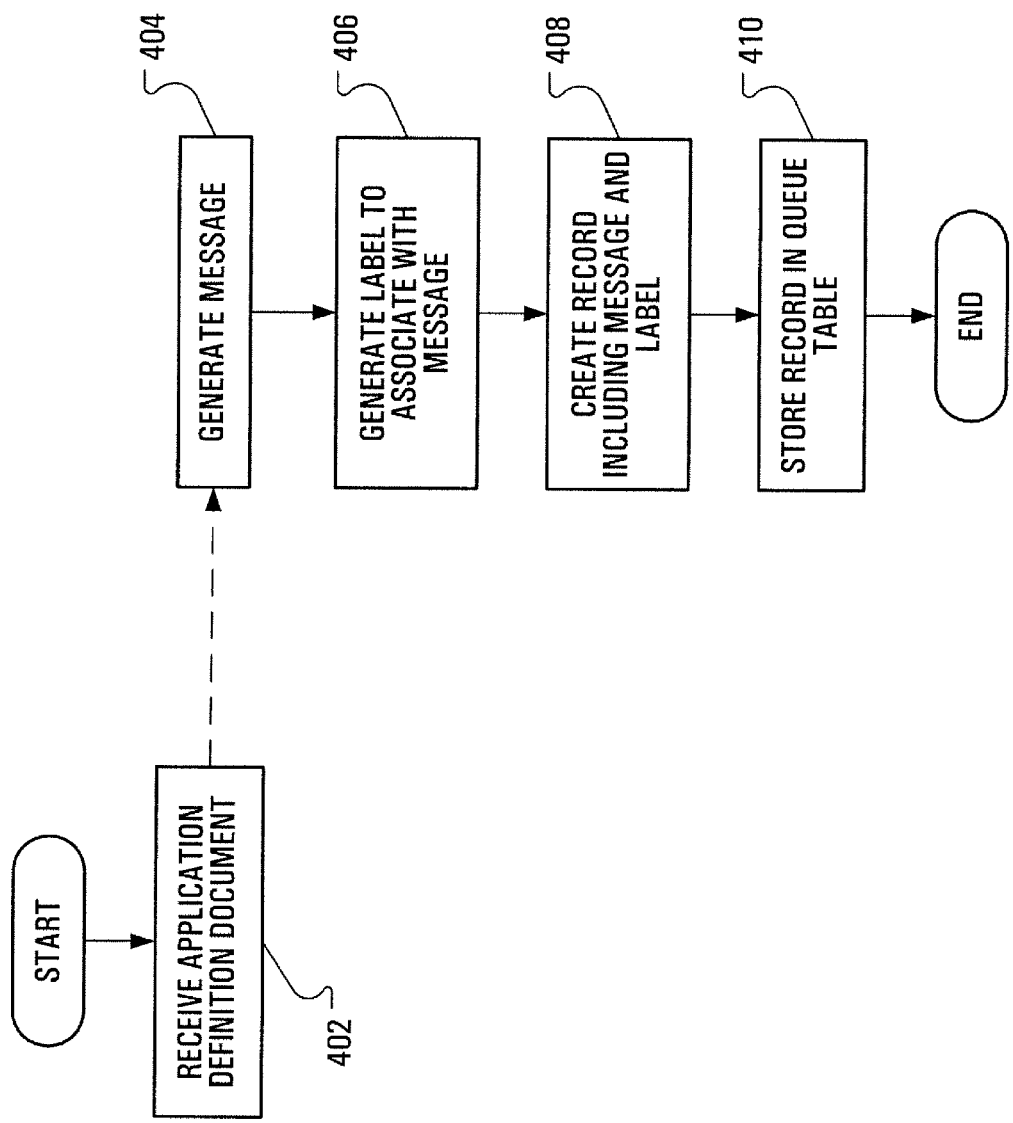
FIG. 4 illustrates steps of an exemplary method of generating a message associated with a label according to an embodiment of the present disclosure.

At the mobile device 101, the application definition document carrying message is received (step 402, FIG. 4). After receiving the application definition document carrying message, the XML parser 302 of the virtual machine 300 may parse the text of the application definition document and the screen generation engine 306 may generate, according to the user interface definition, a user interface for presentation on the display 226 of the mobile device 101. Some time after receipt of the application definition document and using the user interface, a user could trigger the transmission, by the mobile device 101, of a login request to transaction server 120. The login request is received by the transaction server 120 and subsequently transmitted to the server hosting the given server-side application (e.g., the enterprise server 118 or the backend application server 132). The server hosting the given server-side application, according to the logic embedded within the given server-side application, returns a login response to the transaction server 120, which login response the transaction server 120 transmits to the mobile device 101. Subsequent traffic related to the given server-side application, for instance, messages to be transmitted from the mobile device 101 to the server hosting the given server-side application, also flows through the transaction server 120.

As may be understood from the preceding, the transaction server 120 may be considered to manage the flow of data between an application executed at a server and an interface to that application presented at the mobile device 101. Among other operating systems, the transaction server 120 may be implemented on Microsoft™ Windows 2000 or Windows 2003 server. The collection of functions executed at the transaction server 120 may be considered to include application management, access control, event monitoring, session control, transaction queuing, data routing, user management and network connectivity monitoring.

In overview, the application client subsystem module 230C may provide instructions to allow the microprocessor 228 to generate a message of a given type for transmission to the transaction server 120 (FIG. 1). In conjunction with storing the generated message in the outbound message queue, the microprocessor 228 may also store a label such that the label is associated with the stored message. The microprocessor 228 may use a label specified, in the application definition document, for messages of the given type.

As is known in the art, the outbound message queue may be implemented as a "queue table" in a relational database, say, in the persistent flash memory 216. Relational databases may be structured to include tables, which contain records. As such, an outbound message may be stored in a Message field of a message record in the queue table. Advantageously, a new field, a "Label" field, may be defined for the message record, where the Label field is arranged for storage of a label associated with the message stored in the Message field of the message record.

When the mobile device user elects to review the contents of the queue table, a user interface executed on the mobile device may display the label representative of the message. The mobile device user may then take further action. For instance, the mobile device user may interact with the user interface to delete, from the queue table, a message deemed to be out of date. Alternatively, the mobile device user may interact with the user interface to request that transmission of the messages in the queue table be re-attempted. Ideally, the label is sufficient to allow the user to understand the nature of the queued message so that the user may make a subsequent, informed decision.

As discussed above, an application definition document provides a user interface definition. Overall, the application definition document may define for a particular server-side application: a user interface for controlling application functionality and display format (including display flow); the format of data to be exchanged over the data communications network 108; and the format of data to be stored locally at the mobile device 101. The virtual machine may use the operating system software, also executed by the microprocessor 228, and associated application programming interfaces (APIs) to interact with elements of the mobile device 101 in accordance with the received application definition document. In this way, the mobile device 101 may present interfaces for a variety of applications executed at a variety of remote application servers.

While creating an application definition document, a developer may have an opportunity to define a number of types of messages to be sent by the mobile device 101 to the transaction server 120 (some of which may be destined for the backend application server 132 or the enterprise server 118). To implement aspects of the present disclosure at design time, a developer may specify, for a specific type of message, a label to be associated with a queued message.

As presented in the previously cited US patent application Publication 2003/0060896, an exemplary application definition document may be formed using a markup language, such as the known XML or a variant thereof. In accordance with an embodiment of the present disclosure, defined XML elements are interpreted by the virtual machine 300 and may be used as building blocks to present, at the mobile device 101, an interface to server-side applications.

Instances 308 of virtual machine object classes allow the mobile device 101 to process each XML element of a set of supported XML elements. Each of the object classes may be defined to include, for each supported XML element: attributes, which may be used to store parameters defined by the application definition document; and functions, which allow the XML element to be processed at the mobile device 101. As such, the developer may specify a label as an attribute of a XML element in an application definition document.

Appendix B provides an exemplary application definition document whose format should be familiar to those skilled in the art of developing markup language documents. The text <SCREENS STSCRN="GETQUOTE"> begins a definition of a screen named "GETQUOTE". As part of the screen definition and, further, as part of a definition of a MENU element for a menu with a NAME attribute of "mnuMain-Menu", a MENUITEM element with NAME attribute "Get-Quote" is defined. The MENUITEM element with NAME attribute "GetQuote" includes an EVENT element with a TYPE attribute "MENUITEMSELECTED". The EVENT element with a TYPE attribute "MENUITEMSELECTED" is associated with three ACTION elements, having TYPE attributes of: "OPEN"; "SAVE"; and "ARML".

The following is a portion of a further exemplary application definition document.

```
<BTN NAME="btnSend" INDEX="5" CAPTION="Send" X="80"
Y="248" HT="21" WT="76" >
   <EVENTS>
      <EVENT TYPE="BUTTONCLICK">
         <ACTION TYPE="ARML" MSG="Message To
         [SP.MAIL.TO]">
            <ARMLTEXT>
               <PKG TYPE="NEWMSG">
                  <MSG ID="[SP.*.ID]"
                  SUBJECT="[SP.MAIL.SUBJECT]"
                  BODY="[SP.MAIL.BODY]"
                  TO="[SP.MAIL.TO]"/>
               </PKG>
            </ARMLTEXT>
         </ACTION>
      </EVENT>
   </EVENTS>
</BTN>
```

According to the above application definition document portion, the XML element that defines an ACTION element with TYPE attribute "ARML" includes an attribute "MSG" whose value field is provided as "Message To [SP.MAIL.TO]". The value field of the MSG attribute may contain a label representative of the nature of the message.

Notably, the value field of the MSG attribute is arranged to be completed dynamically from data provided by the user, for instance, into edit boxes presented on the display of the mobile device. The value field of the MSG attribute includes a placeholder delimited by square brackets, i.e., "[" and "]". The placeholder reference a data source from which data for filling the corresponding section of the value field should be obtained. A suitable data source might be a user interface field on a current screen, a user interface field on a previous screen or a table in a device-based logical database. The virtual machine 300, after reading the data source name, searches for the field corresponding to the referenced data source and replaces the placeholder with data contained within the named field. In this example, the value field of the MSG attribute references [SP.MAIL.TO]. As such, content for the value field of the MSG attribute may be read from a field named "TO" on a screen named "SP.MAIL".

Additionally, the PKG element to be generated responsive to an event of type "BUTTONCLICK" is also arranged to be completed dynamically based on data provided by the user.

In operation, the virtual machine 300 executed on the microprocessor 228 may control the presentation, on the display 226 of the mobile device 101, of a button displaying a caption "Send" according to the above exemplary application definition document portion. The user of the mobile device 101 may select the button such that an event of the type "BUTTONCLICK" is detected by the operating system of the mobile device 101. The operating system may indicate the detected event to the event handler 304 of the virtual machine 300. The event handler 304 may, based on the definition of the BTN element in the application definition document portion, arrange for the performance of an action, defined by an ACTION element, by the virtual machine 300.

According to the ACTION element of type ARML defined in the application definition document portion above, the event handler 304 instantiates an instance of an object class corresponding to the ACTION element of type ARML. The instance then calls a message generation method to generate a message (step 404, FIG. 4) for transmission to the transaction server 120.

The above application definition document portion provides a format, according to which the message generation method may generate the message. According to the format, the message is a PKG element delimited by <PKG></PKG> tags. The PKG element has a TYPE attribute. Within the PKG element, the message payload is a MSG element. The MSG element has attributes named "ID", "SUBJECT", "BODY" and "TO". Each of the attributes references a placeholder.

The message generation method may, based on the format, add text to a string variable. As mentioned above, elements of the application definition document, including elements of the action, have been parsed by the XML parser 302. The message generation method adds successive portions of the message to the string variable, such as "<PKG TYPE="NEWMSG">", then "<MSG", then "ID="", etc. Before adding the next portion, the message generation method resolves the placeholder "[SP.*.ID]" and adds the text to which the placeholder resolves. In an exemplary resolution of a placeholder, the user has inserted the text "Hello World" in the SUBJECT edit box on the SP.MAIL screen, the message generation method may read the contents of the edit box and add the text "Hello World" to the string variable.

An exemplary message generated according to message format provided in the above exemplary application definition document portion may appear as follows:

```
<PKG TYPE="NEWMSG">
   <MSG ID="98378734" SUBJECT="Hello World" BODY="Sample
   Message" TO="John Doe"/>
</PKG>
```

When the string variable contains the entire message, that is, the message generation method has added the text "</PKG>" to the string variable, the virtual machine 300 may then call a label generation method of the instance to generate a label (step 406) to associate with the exemplary message. In some cases, the label may be static and relate directly to the type of message, for instance, a registration request message may be defined to have a MSG attribute with value field containing "Registration Message". In the case of the exemplary message, however, the label is dynamic. The virtual machine 300 may dynamically resolve the message attribute value field containing "Message To [SP.MAIL.TO]" to a label reading "Message To John Doe" based on the text entered by the user in the TO editbox.

The virtual machine 300 may then call a message record creation method of the instance to create (step 408) a message record. The message record may include the generated message and the label, among other data. The virtual machine 300 may then call a message record storage method to store (step 410) the message record in the queue table. Among the other data, the record creation method may include a time stamp in a Time Stamp field of the message record.

Concurrently, an instance of a message transmission object class (i.e. a message transmission object) may be arranging the transmission of the message portion of the oldest message record in the queue table to the transaction server 120. The message transmission object may, for instance, determine which message record is the oldest in the queue table by considering a "time added" time stamp stored in each message record in the queue table. As such, the queue table may be considered to act as a First-In-First-Out (FIFO) queue in that the message transmission object attempts to transmit the message at the top of the queue, i.e., the message portion of the oldest message record, first.

Where the transmission of the message is successful, the message transmission object deletes the message record from the queue table and arranges the transmission of the message portion of the oldest message record in the queue table given that the former oldest message record has been deleted from the queue table.

Where the transmission of the message is unsuccessful, the message transmission object may delay re-attempting transmission of the message portion of the oldest message record in the queue table for a predetermined waiting time. Additionally, the message transmission object may store the time of the last attempt to transmit the message in a Last Attempt Time field associated with the Message field. The message transmission object may also read a value from a Transmission Attempt Number field associated with the Message field, increment the value by one and store the incremented value in the Transmission Attempt Number field.

Rather than delaying re-attempting transmission for a predetermined waiting time, the message transmission object may wait for a signal from the operating system of the mobile device 101, where the signal indicates that communications to the network have been re-established.

At a subsequent time, the mobile device user may manipulate the input devices of the mobile device 101 to request to review the contents of the queue table. Upon receiving the request (step 502), an instance of a queue management object class (i.e. a queue management object) may then determine the contents of the queue table (step 504). That is, the queue management object may query the database in which is stored the queue table to determine which messages previously stored in the queue table have not yet been transmitted and, consequently, deleted from the queue table. For each message in a Message field in the queue table, the response to the database query may indicate the contents of the associated Time Stamp field, the contents of the associated Label field, the contents of the associated Last Attempt Time field and the contents of the associated Transmission Attempt Number field.

Where the exemplary message discussed above is in the queue table, the screen generation engine 306 may then present a screen (step 506) on the display 226 of the mobile device 101 in which screen the label "Message To John Doe" is presented representative of the exemplary message along with the time at which the message was stored in the queue table, the time of the last attempted transmission and the number of attempted transmissions.

The mobile device user may react to the screen by providing input (step 508). For instance, the user may request that the exemplary message, labeled "Message To John Doe", be deleted from the queue table, say, if the exemplary message is deemed by the user to be out of date. Accordingly, the queue management object may delete the exemplary message from the queue table (step 510). Alternatively, the mobile device user may request that transmission of the messages in the queue table be re-attempted. The event handler 304 may then provide (step 512) the queue management object with a request to re-attempted transmission. Responsive to the request, the queue management object may re-attempt transmission of the oldest message in the queue table.

Notably, the exemplary message may not be the oldest message in the queue table and, as such, may not immediately benefit from the transmission re-attempt. However, where the mobile device 101 has returned into coverage range of a base station and the queue management object would otherwise continue delaying attempting retransmission until the expiry of the predetermined waiting time, the exemplary message may be transmitted sooner in the case of the request for a re-attempt at transmission than in the case of no such request.

The value field of the MSG attribute is evaluated at runtime, as are the other dynamic elements of the message. Notably, the value field of the MSG attribute is not transmitted to the transaction server 1 20 or to the backend application server 132 for use in an application. Indeed, the value field of the MSG attribute is used by the virtual machine 300 only when generating a display of queue table contents on the mobile device 101.

Ideally, the label associated with messages of a predetermined type is sufficient to allow the user to understand the nature of the queued message so that the user may make a subsequent, informed decision.

Other modifications will be apparent to those skilled in the art and, therefore, the invention is defined in the claims.

APPENDIX "A": ARML SPECIFICATION

Contents

| | | |
|---|---|---|
| 1 | Introduction | 22 |
| 1.1 | Purpose of document | 22 |
| 1.2 | Audience | 22 |
| 1.3 | Definitions & Acronyms | 22 |
| 2 | ARML Overview | 23 |
| 2.1 | ARML design considerations | 23 |
| 2.2 | ARML usage | 24 |
| 2.3 | The scratchpad area | 24 |
| 2.4 | System Variables and Functions | 24 |
| 2.4.1 | Variables: | 25 |
| 2.4.2 | Functions: | 25 |
| 2.5 | Single-Field Lookup | 25 |
| 3 | ARML application definition | 26 |
| 3.1 | General | 26 |
| 3.1.1 | Description | 26 |
| 3.1.2 | Structure | 26 |
| 3.1.3 | Tags | 26 |
| 3.2 | Table Definitions Section | 28 |
| 3.2.1 | Description | 28 |
| 3.2.2 | Structure | 28 |
| 3.2.3 | Tags | 28 |
| 3.2.4 | Example | 29 |
| 3.3 | Package Definitions Section | 30 |
| 3.3.1 | Description | 30 |
| 3.3.2 | Structure | 30 |
| 3.3.3 | Tags | 30 |
| 3.3.4 | Example | 32 |
| 3.4 | Device Interface Definitions Section | 33 |
| 3.4.1 | Description | 33 |
| 3.4.2 | Structure | 33 |
| 3.4.3 | Tags | 33 |
| 3.4.4 | Example | 34 |
| 4 | Application-defined packages | 34 |
| 4.1 | General | 34 |
| 4.1.1 | Description | 34 |
| 4.1.2 | Structure | 34 |
| 4.1.3 | Tags | 35 |
| 4.2 | Package information | 36 |
| 4.2.1 | Example | 36 |
| 5 | User interface Definitions | 39 |
| 5.1 | General | 39 |
| 5.1.1 | Description | 39 |
| 5.1.2 | Structure | 39 |

APPENDIX "A": ARML SPECIFICATION

| | | |
|---|---|---|
| 5.1.3 | Tags | 39 |
| 5.2 | Queries definition section | 41 |
| 5.2.1 | Description | 41 |
| 5.2.2 | Structure | 41 |
| 5.2.3 | Tags | 41 |
| 5.3 | Menu definition section | 42 |
| 5.3.1 | Description | 42 |
| 5.3.2 | Structure | 42 |
| 5.3.3 | Tags | 42 |
| 5.4 | Buttons definition section | 43 |
| 5.4.1 | Description | 43 |
| 5.4.2 | Structure | 43 |
| 5.4.3 | Tags | 43 |
| 5.5 | Text Items definition section | 44 |
| 5.5.1 | Description | 44 |
| 5.5.2 | Structure | 44 |
| 5.5.3 | Tags | 44 |
| 5.6 | Edit boxes definition section | 45 |
| 5.6.1 | Description | 45 |
| 5.6.2 | Structure | 45 |
| 5.6.3 | Tags | 45 |
| 5.7 | Choice items definition section | 46 |
| 5.7.1 | Description | 46 |
| 5.7.2 | Structure | 47 |
| 5.7.3 | Tags | 47 |
| 5.8 | Checkboxes definition section | 48 |
| 5.8.1 | Description | 48 |
| 5.8.2 | Structure | 48 |
| 5.8.3 | Tags | 48 |
| 5.9 | Listboxes definition section | 49 |
| 5.9.1 | Description | 49 |
| 5.9.2 | Structure | 49 |
| 5.9.3 | Tags | 50 |
| 5.10 | Grids | 51 |
| 5.10.1 | Description | 51 |
| 5.10.2 | Structure | 51 |
| 5.10.3 | Tags | 51 |
| 5.10.4 | Example | 52 |
| 6 | The Smart Client event model | 53 |
| 6.1 | The EVENTS tag | 53 |
| 6.2 | The EVENT tag | 53 |
| 6.2.1 | The BUTTONCLICK event | 54 |
| 6.2.2 | The MENUITEMSELECTED event | 54 |
| 6.2.3 | The DATA event | 54 |
| 6.3 | The ACTION tag | 54 |
| 6.3.1 | The OPEN action | 54 |
| 6.3.2 | The ARML action | 55 |
| 6.3.3 | The SAVE action | 55 |

APPENDIX "A": ARML SPECIFICATION

| | | |
|---|---|---|
| 6.3.4 | The PURGE action | 55 |
| 6.3.5 | The NOTIFY action | 55 |
| 6.3.6 | The CLOSE action | 55 |
| 6.3.7 | The ALERT action | 55 |
| 6.3.8 | The INTEGRATION action | 55 |
| 6.3.9 | The CLOSESCREEN action | 56 |
| 6.3.10 | The REFRESH action | 56 |
| 6.3.11 | The SAVEITEM action | 56 |
| 6.3.12 | The IF Action | 56 |
| Example of airix event model | | 58 |
| 7 | AVM-server system interactions | 60 |
| 7.1 | General | 60 |
| 7.1.1 | Description | 60 |
| 7.1.2 | Structure | 60 |
| 7.1.3 | Tags | 60 |
| 7.2 | Device Registration & deregistration package | 61 |
| 7.2.1 | Description | 61 |
| 7.2.2 | Structure | 61 |
| 7.2.3 | Tags | 61 |
| 7.2.4 | Example | 61 |
| 7.3 | Registration confirmation package | 62 |
| 7.3.1 | Description | 62 |
| 7.3.2 | Structure | 62 |
| 7.3.3 | Tags | 62 |
| 7.3.4 | Example | 63 |
| 7.4 | Find applications package | 64 |
| 7.4.1 | Description | 64 |
| 7.4.2 | Structure | 64 |
| 7.4.3 | Tags | 64 |
| 7.5 | Find applications confirmation package | 65 |
| 7.5.1 | Description | 65 |
| 7.5.2 | Structure | 65 |
| 7.5.3 | Tags | 65 |
| 7.6 | Application Registration & deregistration package | 66 |
| 7.6.1 | Description | 66 |
| 7.6.2 | Structure | 66 |
| 7.6.3 | Tags | 66 |
| 7.7 | Application registration & deregistration confirmation package | 67 |
| 7.7.1 | Description | 67 |
| 7.7.2 | Structure | 67 |
| 7.7.3 | Tags | 67 |
| 7.7.4 | Example | 67 |
| 7.8 | Setting the active device package | 69 |
| 7.8.1 | Description | 69 |
| 7.8.2 | Structure | 69 |
| 7.8.3 | Tags | 69 |
| 7.8.4 | Example | 69 |
| 7.9 | Set active device response | 69 |

APPENDIX "A": ARML SPECIFICATION

| | | |
|---|---|---|
| 7.9.1 | Description | 69 |
| 7.9.2 | Structure | 69 |
| 7.9.3 | Tags | 69 |
| 7.9.4 | Example | 70 |
| 7.10 | Invalid Application package | 70 |
| 7.10.1 | Description | 70 |
| 7.10.2 | Structure | 70 |
| 7.10.3 | Tags | 70 |
| 7.10.4 | Example | 70 |
| 8 | Application-server system interactions | 71 |
| 9 | ARML future developments | 71 |

APPENDIX "A": ARML SPECIFICATION

1. INTRODUCTION

*1.1 Purpose of document*
This document describes the structure and syntax of the ARML language.

*1.2 Audience*
The document is intended to be read by AIRIX developers and users of ARML.

*1.3 Definitions & Acronyms*

| | |
|---|---|
| ARML | AIRIX Markup Language |
| XML | Extensible Markup Language |

APPENDIX "A": ARML SPECIFICATION

2 ARML OVERVIEW

ARML is an XML markup language used by the AIRIX platform. It performs three tasks;

- Data is passed back and forth between the mobile server, AIRIX platform and enterprise application using ARML.
- The AIRIX Smart Client uses ARML to define the user interface for an AIRIX-enabled application on the mobile device
- The AIRIX server uses ARML to define that data that it stores for the application in its database.

2.1 ARML design considerations

ARML has been designed with the following goals in mind;

- Transactions and screen definitions should be as independent as possible
- AIRIX should be unaware of internals of the enterprise application
- Strict conformance to the XML specification will be enforced
- Operation should be transparent to the end user
- ARML packages should be readable as is
- The minimum number of characters needed should be used

APPENDIX "A": ARML SPECIFICATION

2.2 ARML usage

The diagram below illustrates how ARML is used.

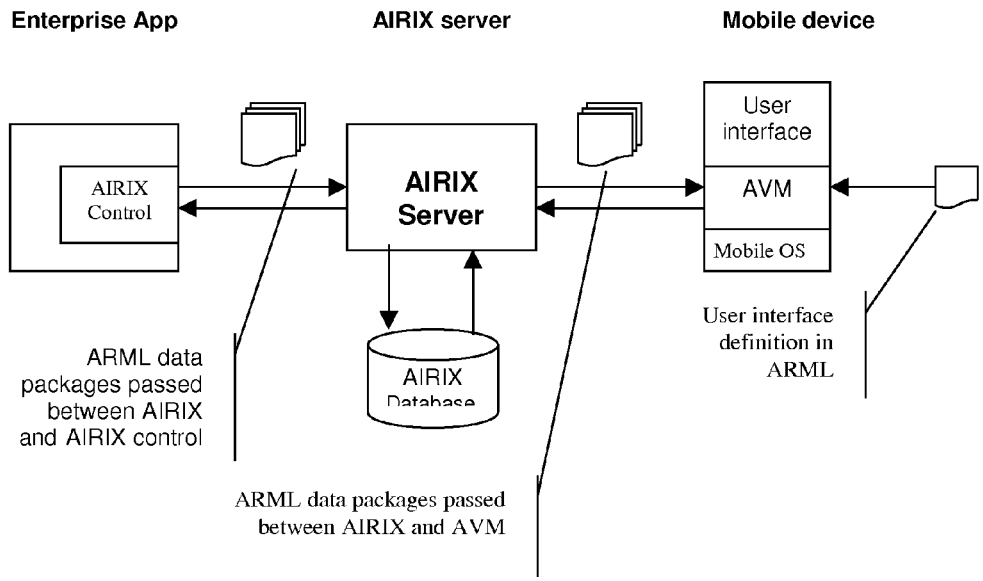

Figure 1 - The ARML environment

The key to ARML usage is the application definition file held on the AIRIX server. This file defines the AIRIX tables for the application, the allowed message set and the user interface definitions for the application on a given device.

2.3 The scratchpad area

The scratchpad is used as a temporary storage area where a global value or a value associated to a screen can be saved for future use. The syntax for a scratchpad value is as follows:
    screen scratchpad value: [SP.*screen.savename*]
    global scratchpad value: [SP.*.*savename*]

The syntax for retrieving a global scratchpad value can also be used to retrieve screen scratchpad values.

2.4 System Variables and Functions

There are several variables that are available that will retrieve application and system values to be used throughout the application. The syntax for these variables are as follows:

APPENDIX "A": ARML Specification
2.4.1 Variables:
[DATE] – returns the current system date, formatted as dd mmm yy
[TIME] – returns the current system time, formatted as hh:mm:ss am/pm.
[SYS.VAR.DATE] - returns the current system date, formatted as dd mmm yy
[SYS.VAR.MOBILEID] - retrieves the device's Mobile ID
[SYS.VAR.APPNAME] - retrieves the name of the application.
    [SYS.VAR.APPVERSION] - retrieves the version number of the application.
[SYS.VAR.SCVERSION] - retrieves the version number of the Smart Client.
[SYS.VAR.ARMLMAJOR] - retrieves the ARML major version of the application.
[SYS.VAR.ARMLMINOR] - retrieves the ARML minor version of the application.

2.4.2 Functions:
[SYS.FUNC.DATEADD([SYS.VAR.DATE],+-*x*)] - The Date Arithmetic tag is used to add or subtract days from the current date. In the tag, *x* represents the number of days added or subtracted. Developers can also choose to substitute a hard-coded date value in the Date Arithmetic tag, in the place of the [SYS.VAR.DATE] tag.

[SYS.FUNC.DATETOSTR([SYS.VAR.DATE],d mmm yyyy h:nn:ss tz)] - The Date To String tag is used to convert date data to a string value.

[SYS.FUNC.STRTODATE([SYS.VAR.DATE],d mmm yyyy h:nn:ss tz)] - The String to Date tag is used to convert string data to a date value, in the RFC 1123 format.

*2.5 Single-Field Lookup*

The single-field lookup will run a simple SELECT query with one where-clause to retrieve specific data. The syntax is as follows:

[DB.DOLOOKUP(*table, field,wherefield,wherevalue*)]

APPENDIX "A": ARML SPECIFICATION

3 ARML APPLICATION DEFINITION

*3.1 General*
3.1.1 Description
The application definition section defines the AIRIX tables and ARML data packages that are used for transactions involved with a specific application.

3.1.2 Structure
The ARML application definition has the following structure;

```
<ARML>
    <AXSCHDEF>
                                            <EVENTS>
                                                    <EVENT>
                                (action definitions)
                                                    </EVENT>
                                            </EVENTS>
            <AXTDEFS>
                    (table definitions)
            </AXTDEFS>
            <DPACKETS>
                    (data package definitions)
            </DPACKETS>
            <DEVICES>
                    (device interface definitions)
            </DEVICES>
    </AXSCHDEF>
</ARML>
```

3.1.3 Tags

3.1.3.1 The <AXSCHDEF> tag

These tags (<AXSCHDEF>...</AXSCHDEF>) mark the start and end of the application definition. THE AXSCHDEF tag has two attributes;

| Attribute | Optional? | Description |
|---|---|---|
| APPNAME | No | The name of the application |
| VERSION | No | Which version of the application the file describes |
| DESC | No | A text description of the application for display purposes |
| ARMLMAJOR | No | The major version of the ARML language this application definition was created with. |
| ARMLMINOR | No | The minor version of the ARML language this application definition was created with. |

3.1.3.2 The <EVENTS> tag
The <EVENT>...</EVENT> pair marks the start and end of a user-interface level event definition. See section 6 for a detailed discussion of the Smart Client event model.

APPENDIX "A": ARML SPECIFICATION

3.1.3.3 The <EVENT> tag

The <EVENT>...</EVENT> pair marks the start and end of a user-interface level event definition. See section 6 for a detailed discussion of the Smart Client event model.

3.1.3.4 The <AXTDEFS> tag

The <AXTDEFS>...</AXTDEFS> pair marks the start and end of the table definitions section. It has no attributes.

3.1.3.5 The <DPACKETS> tag

The <DPACKETS>...</DPACKETS> pair marks the start and end of the data package definitions section. It has no attributes.

3.1.3.6 The <DEVICES> tag

The <DEVICES>...</DEVICES> pair marks the start and end of the device interface definitions section. It has no attributes.

APPENDIX "A": ARML Specification

3.2 Table Definitions Section

3.2.1 Description

The table definitions section defines the tables on the mobile device for the application

3.2.2 Structure

The table definitions section has the following structure;

```
{wrapper tags}
<TDEF>
       <FIELDS>
              <FLD>…</FLD>
       <FIELDS>
</TDEF>
 (etc.)
{wrapper tags}
```

3.2.3 Tags

3.2.3.1 The <TDEF> tag

Each table definition is enclosed within the <TDEF>…</TDEF> pair. The TDEF tag has the following attributes;

| Attribute | Optional? | Description |
| --- | --- | --- |
| NAME | No | The number of table definitions in the section |
| PK | No | Which of the table fields is the primary key for the table |
| DELINDEX | No | The index of this table with respect to all the tables for specifying the delete order. This value is 1 based. |

3.2.3.2 The <FIELDS> tag

The <FIELDS>…</FIELDS> tag pair marks where the fields in a given table are defined. The FIELDS tag has a no attributes.

3.2.3.3 The <FLD> tag

The <FLD>…</FLD> tag pair defines a single field in a table. Enclosed between the tags is the field name. The <FLD> tag has the following structure;

| Attribute | Optional? | Description |
| --- | --- | --- |
| TYPE | No | The data type contained in the field. Permitted values are:<br>INT – integer value<br>STRING – a fixed-length string of n characters (see SIZE field)<br>MEMO – a string of max 65535 characters<br>AUTOINC – an integer value, automatically incremented by the database. This field will be read-only to the applications.<br>DATETIME – a datetime value |
| SIZE | No | If the TYPE is set to STRING, this field specifies the number of characters in the field |
| INDEXED | No | Specifies if the field needs to be indexed in the AIRIX database |
| REFERENCEFIELD | Yes | If this attribute is present, it defines that this field is a foreign key. The foreign table/field is given in the format "table(field)" |
| ALLOWNULL | No | Specifies if the field is allowed to have a null value |

APPENDIX "A": ARML SPECIFICATION

3.2.4 Example

An email application would use 2 tables for storing sent emails.

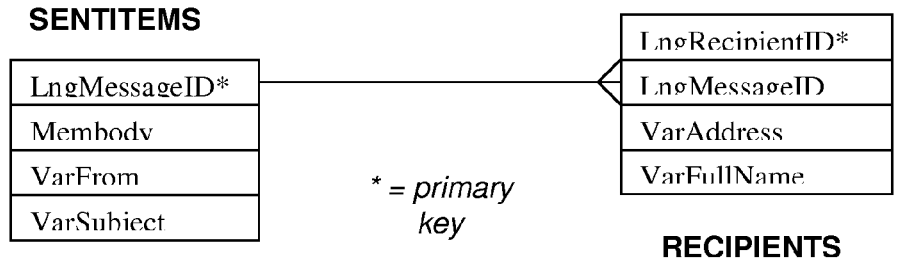

Figure 2 - sample email schema

This translates into the following ARML fragment;

```
<TDEF NAME="SENTITEMS" UPDATETYPE=NEW PK=LNGMESSAGEID DELINDEX=2>
    <FIELDS>
        <FLD TYPE="INT" SIZE="0" INDEXED="NO" REFERENCEFIELD=""
            ALLOWNULL="NO">LNGMESSAGEID</FLD>
        <FLD TYPE="STRING" SIZE="200" INDEXED="NO" REFERENCEFIELD=""
            ALLOWNULL="YES">VARFROM</FLD>
        <FLD TYPE="MEMO" SIZE="0" INDEXED="NO" REFERENCEFIELD=""
            ALLOWNULL="YES">MEMBODY</FLD>
        <FLD TYPE="STRING" SIZE="200" INDEXED="NO" REFERENCEFIELD=""
            ALLOWNULL="YES">VARSUBJECT</FLD>
    </FIELDS>
</TDEF>
<TDEF NAME="RECIPIENTS" UPDATETYPE=NEW PK=LNGRECIPIENTID DELINDEX=1>
    <FIELDS>
        <FLD TYPE="INT" SIZE="AUTOINC" INDEXED="NO" REFERENCEFIELD=""
            ALLOWNULL="NO">LNGMESSAGEID</FLD>
        <FLD TYPE="INT" SIZE="0" INDEXED="YES"
            REFERENCEFIELD="SENTITEMS(MESSAGEID)"
            ALLOWNULL="NO">LNGMESSAGEID</FLD>
        <FLD TYPE="STRING" SIZE="200" INDEXED="NO" REFERENCEFIELD=""
            ALLOWNULL="YES">VARFULLNAME</FLD>
        <FLD TYPE="STRING" SIZE="200" INDEXED="NO" REFERENCEFIELD=""
            ALLOWNULL="YES">VARADDRESS</FLD>
    </FIELDS>
</TDEF>
```

Figure 3 - a sample table definition section

APPENDIX "A": ARML SPECIFICATION

3.3 Package Definitions Section

3.3.1 Description
The package definitions section defines the structure of the application packages and the data that they carry.

3.3.2 Structure
The package definitions section has the following structure:

```
{wrapper tags}
<AXDATAPACKET>
        <TABLEUPDATES>
                <TUPDATE>
                        <PKGFIELDS>
                                <PKGFLD>...</PKGFLD>
                                <PKGFLD>...</PKGFLD>
                        </PKGFIELDS>
                </TUPDATE>
        </TABLEUPDATES>
        <TABLEUPDATES>
                <TUPDATE>
                        <PKGFIELDS>
                                <PKGFLD>...</PKGFLD>
                                <PKGFLD>...</PKGFLD>
                                (etc.)
                        </PKGFIELDS>
                </TUPDATE>
        </TABLEUPDATES>
            (etc.)
</AXDATAPACKET>
{wrapper tags}
```

3.3.3 Tags

3.3.3.1 The <AXDATAPACKET> tag

The <AXDATAPACKET>...</AXDATAPACKET> pair delimits a package definition. The tag has the following attributes;

| Attribute | Optional? | Description |
| --- | --- | --- |
| BODY | No | This field gives the name by which the data package is known |
| UPDATELOCALDATA | No | Specifies whether the package is to update the local database. |
| SENDTOAPP | No | Specifies whether the package is sent to the application server |

3.3.3.2 The <TABLEUPDATES> tag

The <TABLEUPDATES>...</TABLEUPDATES> pair marks the start and end of the table definitions section. It has no attributes.

3.3.3.3 The <TUPDATE> tag

Each table update is enclosed within the <TUPDATE>...</TUPDATE> pair. The TUPDATE tag has the following attributes;

| Attribute | Optional? | Description |
| --- | --- | --- |

APPENDIX "A": ARML SPECIFICATION

| TABLE | No | The table in the database that is updated |
|---|---|---|
| UPDATETYPE | No | The type of update that is being made to the database. Possible values are;<br>ADD – adds a new record into the table<br>DELETE – removes a record into the table<br>UPDATE – modifies a record in the table |
| WHEREFIELD | Yes | For a conditional update of a table, specifies the field and table to match on. This is in the format "table(field)". |
| WHEREPARAM | Yes | Text string specifying the value. This tag has no meaning and will be skipped unless the WHEREFIELD attribute has been specified. |
| SECTION | No | An identifier for the section in the data package |
| MULTIROW | No | Boolean field specifying whether multiple rows can be updated by the tag |
| MULTIROWIDENT | Yes | If the MULTIROW attribute is set to 'YES', this field is required and specifies the |

3.3.3.4 The <PKGFIELDS> tag

The <PKGFIELDS>...</PKGFIELDS> tag pair marks where the fields in a given data package are defined. The PKGFIELDS tag has no attributes.

3.3.3.5 <The PKGFLD> tag

The <PKGFLD>...</PKGFLD> tag pair defines a single parameter in a given data package. Enclosed between the <PKGFLD>...</PKGFLD> tags is the field name. The <PKGFLD> tag has the following attributes;

| Attribute | Optional? | Description |
|---|---|---|
| NAME | No | This is the field in the AIRIX database that maps to the user interface field |
| PARAMTYPE | No | This defines the type of parameter. It can take two values;<br>PROP – this means that the parameter appears as part of the tag definition<br>VALUE – this means that the parameter is contained between the two tags. Only one parameter in a given data package can be of this type |

APPENDIX "A": ARML SPECIFICATION

3.3.4 Example

Using the table definitions example in section 3.2.4, when the user sends an email, a data package to transport the data would update the 'SENTITEMS' table and the 'RECIPIENTS' table. The following ARML fragment defines such a data package;

```
<AXDATAPACKET BODY="ME" SENDTOMOBILE="NO" SENDTOAPP="YES">
    <TABLEUPDATES>
        <TUPDATE TABLE="SENTITEMS" UPDATETYPE="ADD" WHEREFIELD="" WHEREPARAM=""
            WHERETYPE="PROP" SECTION="MAIL" MULTIROW="NO" MULTIROWIDENT="">
            <FIELDS>
                <PKGFLD NAME="LNGMESSAGEID" PARAMTYPE="PROP">MSGID</PKGFLD>
                <PKGFLD NAME="VARFROM" PARAMTYPE="PROP">FROM</PKGFLD>
                <PKGFLD NAME="VARSUBJECT" PARAMTYPE="PROP">SUBJECT</PKGFLD>
                <PKGFLD NAME="MEMBODY" PARAMTYPE="VALUE">DATA</PKGFLD>
            </FIELDS>
        </TUPDATE>
        <TUPDATE TABLE="RECIPIENTS" UPDATETYPE="ADD" WHEREFIELD="" WHEREPARAM=""
            WHERETYPE="PROP" SECTION="RECIPS" MULTIROW="YES"
            MULTIROWIDENT="RCP">
            <FIELDS>
                <PKGFLD NAME="LNGMESSAGEID" PARAMTYPE="PROP">MSGID</PKGFLD>
                <PKGFLD NAME="VARFULLNAME" PARAMTYPE="PROP">TO</PKGFLD>
                <PKGFLD NAME="VARADDRESS" PARAMTYPE="PROP">ADDRESS</PKGFLD>
            </FIELDS>
        </TUPDATE>
    </TABLEUPDATES>
</AXDATAPACKET>
```

Figure 4 - a sample package definition

APPENDIX "A": ARML SPECIFICATION

3.4 Device Interface Definitions Section

3.4.1 Description

The display definitions section contains the user interface definitions for the various mobile devices that an application supports.

3.4.2 Structure

The device display definitions section has the following structure;

```
{wrapper tags}
<DEV>
       <SCREENS>
             <SCREEN>
                    {screen definitions}
             </SCREEN>
       </SCREENS>
</DEV>
(other devices)
{wrapper tags}
```

3.4.3 Tags

3.4.3.1 The <DEV> tag

The <DEV>...</DEV> pair delimits an interface definition for a specific device. The tag has the following attributes;

| Attribute | Optional? | Description |
| --- | --- | --- |
| TYPE | No | The type of device. Allowed values are:<br>RIM – a Research in Motion Blackberry pager<br>WAP – a WAP phone<br>CE – Pocket PC |

3.4.3.2 The <SCREENS> tag

The <SCREENS>...</SCREENS> pair delimits the screens definition for a specific device. The tag has one attribute;

| Attribute | Optional? | Description |
| --- | --- | --- |
| STSCRN | No | The first screen that is displayed when the application starts |

3.4.3.3 The <SCREEN> tag

The <SCREEN>...</SCREEN> pair, and its contents are described in section 5.1.3.1

APPENDIX "A": ARML SPECIFICATION

3.4.4 Example

The following example shows the screen definitions section for an application that allows a user to view their inbox and the mails in it.

```
{wrapper tags}
<DEV TYPE="RIM">
        <SCREENS>
                <SCREEN NAME="INBOX ">
                        {screen definition}
                </SCREEN>
                <SCREEN NAME="VIEWNEWMAIL">
                        {screen definition}
                </SCREEN>
        </SCREENS>
</DEV>
<DEV TYPE="PALM">
        <SCREENS>
                <SCREEN NAME="INBOX">
                        {screen definition}
                </SCREEN>
                <SCREEN NAME="VIEWNEWMAIL">
                        {screen definition}
                </SCREEN>
        </SCREENS>
</DEV>
{wrapper tags}
```

4 APPLICATION-DEFINED PACKAGES

This section describes the format of application defined packages.

*4.1 General*

This section describes the general structure of an application-specific data package. As described in section , ;

4.1.1 Description

System level packages are sent between AIRIX and the application server, and between AIRIX and the AVM

4.1.2 Structure

An application defined package has the following structure;

```
<ARML>
        <HEAD>
                (header information)
        </HEAD>
        <PKG>
                (package information)
        </PKG>
</ARML>
```

APPENDIX "A": ARML SPECIFICATION
4.1.3 Tags

4.1.3.1 The <HEAD> tag

The <HEAD> tag is as described in section 7.1.3.1

4.1.3.2 The <PKG> tag

The <PKG>...</PKG> tags delimit the package data. The PKG tag has the following attributes;

| Attribute | Optional? | Description |
|---|---|---|
| TYPE | No | A text string identifying the type of package being sent |

APPENDIX "A": ARML SPECIFICATION

*4.2 Package information*

The format and rules for application-defined data packages depend on the package definitions for that application.

4.2.1 Example

A sample data package following the rules in section 3.3.4 would have a body section like this;

```
{wrapper tags}
<PKG TYPE="ME">
    <MAIL MSGID="1" FROM="Tim Neil" FROMADDRESS="timn@nextair.com"
        SUBJECT="Hello Back">
    <DATA>I am responding to your message</DATA>
    </MAIL>
    <RECIPS>
        <RCP MSGID="1" TO="Jeff Jones"
            ADDRESS="jeff@nextair.com"></RCP>
        <RCP MSGID="1" TO="Scott Neil"
            ADDRESS="scottn@nextair.com"></RCP>
        <RCP MSGID="1" TO="Steve Hulaj"
            ADDRESS="steveh@nextair.com"></RCP>
    </RECIPS>
</PKG>
{wrapper tags}
```

Figure 5:
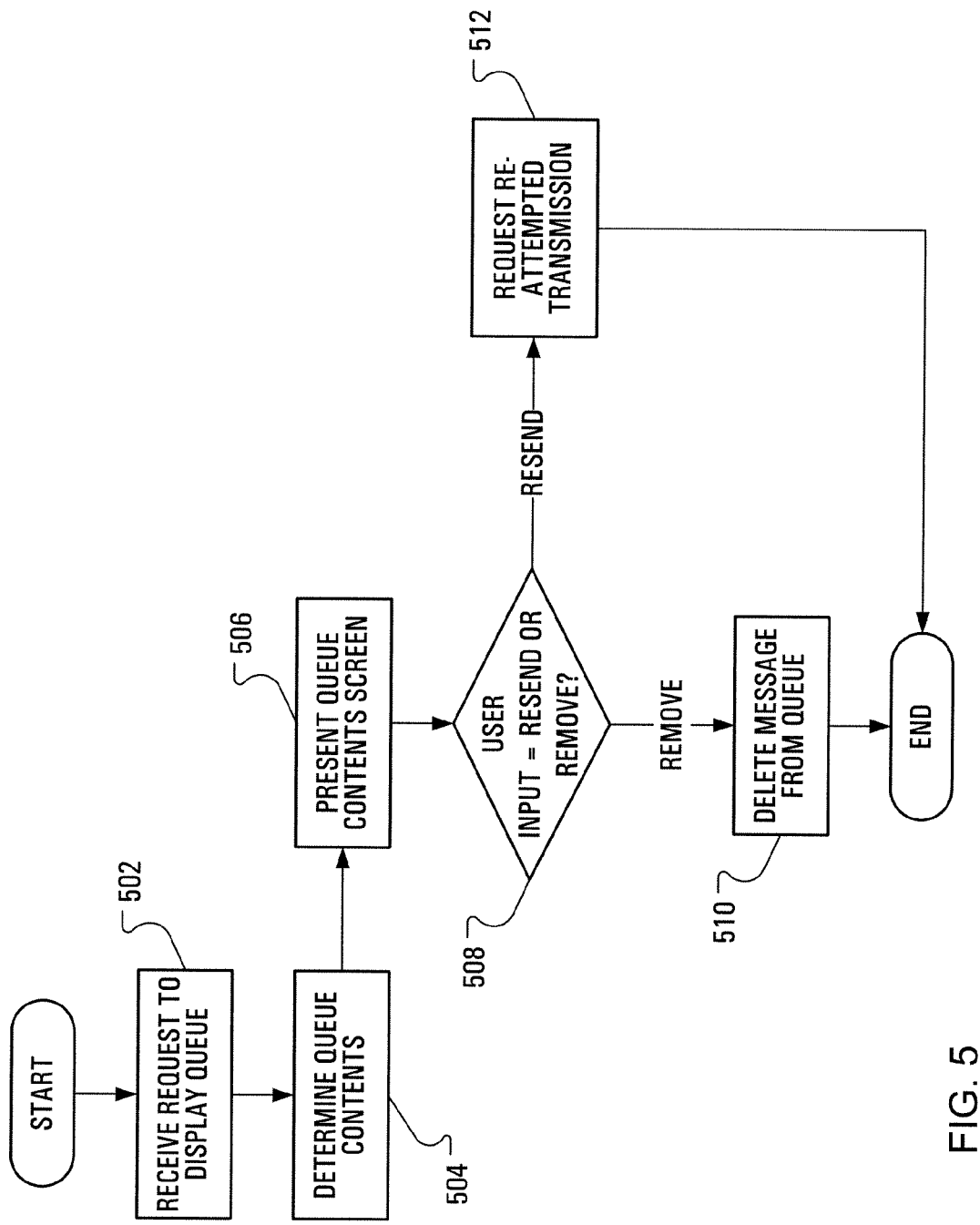
FIG. 5 illustrates steps of an exemplary method of presenting a display of contents of a queue according to an embodiment of the present disclosure.

Figure 5 - a sample package

We will use this sample package to illustrate how packages are derived from the package definition file. The first tag in the package is the BODY tag. This tag defines which type of package it is;

Package Definition
```
<AXDATAPACKET BODY="ME" UPDATELOCALDATA="NO"
```
Package
```
<BODY TYPE="ME">
```

The package has two sections, which correspond to the two table update sections in the package definition;

APPENDIX "A": ARML Specification

Package Definition

```
<TUPDATE TABLE="SENTITEMS" UPDATETYPE="ADD" WHEREFIELD="" WHEREPARAM=""
    WHERETYPE="PROP" SECTION="MAIL" MULTIROW="NO" MULTIROWIDENT="">

<TUPDATE TABLE="RECIPIENTS" UPDATETYPE="ADD" WHEREFIELD="" WHEREPARAM=""
        WHERETYPE="PROP" SECTION="RECIPS" MULTIROW="YES"
        MULTIROWIDENT="RCP">
```

Package

```
<MAIL MSGID="1" FROM="Tim Neil"
<RECIPS>
    <RCP>
    <RCP>
    <RCP>
</RECIPS>
```

APPENDIX "A": ARML SPECIFICATION

The 'MAIL' section updates the 'SENTITEMS' table in the database. It does not update multiple rows. The 'RECIPS' section updates the 'RECIPIENTS' table in the database; it does update multiple rows, and each row is contained within a pair of <RCP> tags.

Each of the MAIL and RCP tags have fields which are used to update the field in the database tables;

Package Definition

```
<FIELDS>
    <PKGFLD NAME="LNGMESSAGEID" PARAMTYPE="PROP">MSGID</PKGFLD>

<PKGFLD NAME="VARFULLNAME" PARAMTYPE="PROP">TO</PKGFLD>

<PKGFLD NAME="VARADDRESS" PARAMTYPE="PROP">ADDRESS</PKGFLD>
</FIELDS>
```

Package

```
<RCP MSGID="1" TO="Jeff Jones" ADDRESS="jeff@nextair.com"></RCP>
```

APPENDIX "A": ARML SPECIFICATION

5 USER INTERFACE DEFINITIONS

*5.1 General*
5.1.1 Description
A screen definition file defines a single screen for a specific device.

5.1.2 Structure
A screen definition file has the following structure;

```
<ARML>
    <SCREEN>
        <EVENTS>
            <EVENT>
                <ACTION>...</ACTION>
            </EVENT>
        </EVENTS>
        <QUERIES>
            (menu definition)
        </QUERIES>
        <MENUS>
            (menu definition)
        </MENUS>
        <BUTTONS>
            (button definitions)
        </BUTTONS>
        <TEXTITEMS>
            (textitem definitions)
        </TEXTITEMS>
        <EDITBOXES>
            (edit box definitions)
        </EDITBOXES>
        <CHOICEITEMS>
            (choice item definitions)
        </CHOICEITEMS>
        <IMAGES>
            (image definitions)
        </IMAGES>
        <LISTBOXES>
            (list box definitions)
        </LISTBOXES>
        <CHECKBOXES>
            (check box definitions)
        </CHECKBOXES>
        <GRIDS>
            (check grid definition)
        </GRIDS>
    </SCREEN>
</ARML>
```

5.1.3 Tags

5.1.3.1 The SCREEN tag
The <SCREEN>...</SCREEN> pair marks the start and end of the screen definitions section. It has attribute –

APPENDIX "A": ARML SPECIFICATION

| Attribute | Optional? | Description |
|---|---|---|
| NAME | No | An identifier for the screen. This is used to qualify variables and navigate between screens |
| TITLE | No | The title that appears for the screen. |
| BACKGROUND | Yes | If used, an image that appears behind the interface elements |
| ORDERED | Yes, only applicable on WAP | If yes, WML is created with ORDERED property set to true, if NO, WML is created with ORDERED property set to false. Only applicable on WAP. See WML standard for definition of ORDERED. |

5.1.3.2 The <EVENTS> tag

The <EVENT>...</EVENT> pair marks the start and end of a user-interface level event definition. See section 6 for a detailed discussion of the Smart Client event model.

5.1.3.3 The <EVENT> tag

The <EVENT>...</EVENT> pair marks the start and end of a user-interface level event definition. See section 6 for a detailed discussion of the Smart Client event model.

5.1.3.4 The <ACTION> tag

The <ACTION>...</ACTION> pair marks the start and end of an action definition. See section 6 for a detailed discussion of the Smart Client event model.

5.1.3.5 The QUERIES tag

The <QUERIES>...</QUERIES> pair marks the start and end of the queries definitions section. It has no attributes.

5.1.3.6 The MENUS tag

The <MENUS>...</MENUS> pair marks the start and end of the menu definition section. It has no attributes.

5.1.3.7 The BUTTONS tag

The <BUTTONS>...</BUTTONS> pair marks the start and end of the button definitions section. It has no attributes.

5.1.3.8 The TEXTITEMS tag

The <TEXTITEMS>...</TEXTITEMS> pair marks the start and end of the text items section. It has no attributes.

5.1.3.9 The EDITBOXES tag

The <EDITBOXES>...</EDITBOXES> pair marks the start and end of the editboxes section. It has no attributes.

5.1.3.10 The CHOICEITEMS tag

The <CHOICEITEMS>...</CHOICEITEMS> pair marks the start and end of the choiceitems section. It has no attributes.

5.1.3.11 The IMAGES tag

The <IMAGES>...</IMAGES> pair marks the start and end of the images section. It has no attributes.

APPENDIX "A": ARML SPECIFICATION

5.1.3.12 The CHECKBOXES tag

The <CHECKBOXES>...</CHECKBOXES> pair marks the start and end of the checkboxes section. It has no attributes.

5.1.3.13 The LISTBOXES tag

The <LISTBOXES>...</LISTBOXES> pair marks the start and end of the listboxes section. It has no attributes.

5.1.3.14 The GRIDS tag

The <GRIDS>...</GRIDS> pair marks the start and end of the grids section. It has no attributes.

5.2 Queries definition section

5.2.1 Description

The queries definition section describes any queries that need to be run to populate a screen.

5.2.2 Structure

The queries definition section has the following structure;

```
{wrapper tags}
<QUERIES>
      <QUERY>
            <W>...</W>
      </QUERY>
</QUERIES>
{wrapper tags}
```

5.2.3 Tags

5.2.3.1 The <QUERIES> tag

The <QUERIES> ... </QUERIES> pair marks the start and end of query definition section. It has no attributes.

5.2.3.2 The <QUERY> tag

The <QUERY>...</QUERY> pair marks the start and end of a given query. It has the following attributes;

| Attribute | Optional? | Description |
| --- | --- | --- |
| NAME | No | Name of the query. |
| TABLE | No | The table in the database that is updated |
| ORDERBY | Yes | Specifies the name of the field in the table that the results are to be ordered on. |
| ORDERDIR | Yes | ASC or DESC, sort ascending or descending respectively. If ORDERBY is present and ORDERDIR is not, ASC is assumed. |

APPENDIX "A": ARML SPECIFICATION

5.2.3.3 The <W> tag

The <W>...</W> pair marks the start and end of a given where-clause. The value of the parameter is contained within the <W>...</W> tags. This value can be a specific value or a reference to a user interface field in the format "[SP.screen.savename] or [QU.query.field]". It has the following attributes;

| Attribute | Optional? | Description |
|---|---|---|
| F | No | Specifies the field to match on. |
| E | No | Specifies the expression type. Available expression types include:<br>EQ<br>NE<br>LT<br>GT<br>BW (applicable only to fields of type STRING) |

5.3 Menu definition section

5.3.1 Description

The menu definition section describes the menu for a given screen.

5.3.2 Structure

The menu definition section has the following structure;

```
{wrapper tags}

<MENUS>
   <MENU>
       <MENUITEM>
           <EVENTS>
               <EVENT>
                   <ACTION>...</ACTION>
               </EVENT>
           </EVENTS>
       </MENUITEM>
   </MENU>
</MENUS>
{wrapper tags}
```

5.3.3 Tags

5.3.3.1 The <MENUS> tag

The <MENUS> ... </MENUS> pair marks the start and end of menu definition section. It has no attributes.

5.3.3.2 The <MENU> tag

The <MENU> ... </MENU> pair marks the start and end of a menu definition. It has the following attributes.

| Attribute | Optional? | Description |
|---|---|---|
| NAME | No | An internal identifier for the menu |
| CAPTION | No | The text that appears for this item in the menu |

APPENDIX "A": ARML SPECIFICATION

5.3.3.3 The <MENUITEM> tag

The <MENUITEM>...</MENUITEM> pair marks the start and end of a menuitem definition. It has the following tags;

| Attribute | Optional? | Description |
|---|---|---|
| NAME | No | An internal identifier for the menu |
| CAPTION | No | The text that appears for this item in the menu |
| INDEX | Yes | The index of this menu item with respect to all of the menu items on this menu. |
| READONLY | Yes | If True, the menu item is inactive. False is the default. |

5.3.3.4 The <EVENTS> tag

The <EVENT>...</EVENT> pair marks the start and end of a user-interface level event definition. See section 6 for a detailed discussion of the Smart Client event model.

5.3.3.5 The <EVENT> tag

The <EVENT>...</EVENT> pair marks the start and end of a user-interface level event definition. See section 6 for a detailed discussion of the Smart Client event model.

5.3.3.6 The <ACTION> tag

The <ACTION>...</ACTION> pair marks the start and end of an action definition. See section 6 for a detailed discussion of the Smart Client event model.

*5.4 Buttons definition section*

5.4.1 Description

The buttons definition section describes the buttons that appear on a given screen.

5.4.2 Structure

The buttons definition section has the following structure;

```
{wrapper tags}
<BTN>
        <EVENTS>
                <EVENT>
                        <ACTION>...</ACTION>
                </EVENT>
        </EVENTS>
</BTN>
{wrapper tags}
```

5.4.3 Tags

5.4.3.1 The BTN tag

The <BTN>...</BTN> pair marks the start and end of a button definition. It has one attribute

| Attribute | Optional? | Description |
|---|---|---|
| NAME | No | An identifier for the button. |
| INDEX | No | The order in which the button appears |
| CAPTION | No | The caption that appears on a given button |
| X | Yes | The X-coordinate of the button on the screen. This attribute may not be |

APPENDIX "A": ARML SPECIFICATION

|  |  | meaningful in some display environments, in which case it would be skipped without processing by the parser |
|---|---|---|
| Y | Yes | The Y-coordinate of the button on the screen. This attribute may not be meaningful in some display environments, in which case it would be skipped without processing by the parser |
| HT | Yes | This is the Height of the button. This attribute may not be meaningful in some display environments, in which case it would be skipped without processing by the parser |
| WT | Yes | This is the Width of the Button. This attribute may not be meaningful in some display environments, in which case it would be skipped without processing by the parser |
| READONLY | Yes | If True, the button is not enabled. False is the default. |

5.4.3.2 The <EVENTS> tag

The <EVENT>...</EVENT> pair marks the start and end of a user-interface level event definition. See section 6 for a detailed discussion of the Smart Client event model.

5.4.3.3 The <EVENT> tag

The <EVENT>...</EVENT> pair marks the start and end of a user-interface level event definition. See section 6 for a detailed discussion of the Smart Client event model.

5.4.3.4 The <ACTION> tag

The <ACTION>...</ACTION> pair marks the start and end of an action definition. See section 6 for a detailed discussion of the Smart Client event model.

5.5 *Text Items definition section*
5.5.1 Description
The text items definition

5.5.2 Structure
The text items section has the following structure;

```
{wrapper tags}
<TI>
        <EVENTS>
                <EVENT>
                        <ACTION>...</ACTION>
                </EVENT>
        </EVENTS>
</TI>
{wrapper tags}
```

5.5.3 Tags

5.5.3.1 The TI tag

The <TI>...</TI> pair marks the start and end of the screen definitions section. It has attribute –

| Attribute | Optional? | Description |
|---|---|---|
| INDEX | No | The order in which the text item appears |
| NAME | No | An Identifier for the Text Item |
| CAPTION | No | Text to appear on the Text Item |

APPENDIX "A": ARML SPECIFICATION

| X | Yes | The X-coordinate of the text item on the screen. This attribute may not be meaningful in some display environments, in which case it would be skipped without processing by the parser |
|---|---|---|
| Y | Yes | The Y-coordinate of the text item on the screen. This attribute may not be meaningful in some display environments, in which case it would be skipped without processing by the parser |
| HT | Yes | This is the Height of the Text Item. This attribute may not be meaningful in some display environments, in which case it would be skipped without processing by the parser |
| WT | Yes | This is the Width of the Text Item. This attribute may not be meaningful in some display environments, in which case it would be skipped without processing by the parser |

5.5.3.2 The <EVENTS> tag

The <EVENT>...</EVENT> pair marks the start and end of a user-interface level event definitio-n. See section 6 for a detailed discussion of the Smart Client event model.

5.5.3.3 The <EVENT> tag

The <EVENT>...</EVENT> pair marks the start and end of a user-interface level event definition. See section 6 for a detailed discussion of the Smart Client event model.

5.5.3.4 The <ACTION> tag

The <ACTION>...</ACTION> pair marks the start and end of an action definition. See section 6 for a detailed discussion of the Smart Client event model.

*5.6  Edit boxes definition section*
5.6.1  Description
The edit boxes definition section describes what edit boxes exist for the screen.

5.6.2  Structure
The edit boxes section has the following structure;

```
{wrapper tags}
<EB>
       <EVENTS>
              <EVENT>
                     <ACTION>...</ACTION>
              </EVENT>
       </EVENTS>
</EB>
{wrapper tags}
```

5.6.3  Tags

5.6.3.1  The EB tag
The <EB>...</EB> pair marks an edit box definition. It has the following attributes –

| Attribute | Optional? | Description |
|---|---|---|
| NAME | No | An identifier for the edit box. |

APPENDIX "A": ARML SPECIFICATION

| TEXT | No | The text to display in the edit box before any entry has been made. Only used if the DATASRC attribute is invalid or omitted. Can be a scratchpad or query value of the form [SP.screen.savename] or [QU.query.field]. |
|---|---|---|
| INDEX | No | The order in which the edit box appears |
| CAPTION | No | The caption for on a given edit box. |
| MULTILINE | No | Boolean field that indicates whether the edit box is a multiline field. |
| SAVE | No | Boolean value indicating whether or not to save the value in this field to temporary storage for use by other screens later on. Saving the value to the scratchpad is triggered by either exiting the screen or by an explicit 'SAVE' action on a user interface control. |
| SAVENAME | Yes | If present, the name to save the field under in the scratchpad. This attribute has no meaning unless the SAVE attribute is set to 'Yes' |
| X | Yes | The X-coordinate of the edit box on the screen. This attribute may not be meaningful in some display environments, in which case it would be skipped without processing by the parser |
| Y | Yes | The Y-coordinate of the edit box on the screen. This attribute may not be meaningful in some display environments, in which case it would be skipped without processing by the parser |
| HT | Yes | The Height of the Edit Box. This attribute may not be meaningful in some display environments, in which case it would be skipped without processing by the parser |
| WT | Yes | The Width of the Edit Box. This attribute may not be meaningful in some display environments, in which case it would be skipped without processing by the parser |
| FT | Yes | Specifies the type of value expected (INT, STRING, MEMO,DATETIME) for the VM to validate prior to continuing a Save. If omitted, STRING is the default data type. |
| DATASRC | Yes | If present, the query and field in the query that populates this edit box. This is given in the format "query.field". |
| READONLY | Yes | If "TRUE" the edit box will be read only, otherwise it is editable. "FALSE is the default value. |

5.6.3.2 The <EVENTS> tag

The <EVENT>...</EVENT> pair marks the start and end of a user-interface level event definition. See section 6 for a detailed discussion of the Smart Client event model.

5.6.3.3 The <EVENT> tag

The <EVENT>...</EVENT> pair marks the start and end of a user-interface level event definition. See section 6 for a detailed discussion of the Smart Client event model.

5.6.3.4 The <ACTION> tag

The <ACTION>...</ACTION> pair marks the start and end of an action definition. See section 6 for a detailed discussion of the Smart Client event model.

5.7 Choice items definition section
5.7.1 Description

The choice item definitions section describes the choice items that exist on a given screen. A choice item is an interface item that requires the user to make a selection from a list of options. It can be represented in different ways on different devices; on a RIM pager, it is a choice box, while on a WinCE device, it is a drop-down list.

APPENDIX "A": ARML SPECIFICATION
5.7.2 Structure
The choice items section has the following structure;

```
{wrapper tags}
<CHOICE>
      <EVENTS>
            <EVENT>
                  <ACTION>...</ACTION>
            </EVENT>
      </EVENTS>
      <ITEMS>
            <I>...</I>
      </ITEMS>
</CHOICE>
{wrapper tags}
```

5.7.3 Tags

5.7.3.1 The <CHOICE> tag

The <CHOICE>...</CHOICE> pair marks the start and end of a choice item definition. It has these attributes –

| Attribute | Optional? | Description |
| --- | --- | --- |
| NAME | No | An identifier for the choice item. |
| TEXT | No | The text to display in the choice item before any selection has been made. |
| INDEX | No | The order in which the choice item appears |
| CAPTION | No | The caption that appears for a given choice item |
| SAVE | No | Boolean value indicating whether or not to save the value in this field to temporary storage for use by other screens later on. Saving the value to the scratchpad is triggered by either exiting the screen or by an explicit 'SAVE' action on a user interface control. |
| SAVENAME | Yes | If present, the name to save the field under in the scratchpad. This attribute has no meaning unless the SAVE attribute is set to 'Yes' |
| X | Yes | The X-coordinate of the choice item on the screen. This attribute may not be meaningful in some display environments, in which case it would be skipped without processing by the parser |
| Y | Yes | The Y-coordinate of the choice item on the screen. This attribute may not be meaningful in some display environments, in which case it would be skipped without processing by the parser |
| DATASRC | Yes | If present, the query and field in the query that populates this choice item. This is given in the format "query.field". |
| IDDATASRC | Yes | If present, the query and field in the query that populates the Ids for this choice item. This is given in the format "query.field". The ID values created by the attributes should correspond directly to the choice item values. I.e. they should create a value, id pair. |
| READONLY | Yes | If "True", the control cannot be modified. "False" is the default. |
| SI | Yes | The value to indicate which item of the choice item is to be selected when loaded. This value will be compared with the ID property (hard-coded items) or the IDDATASRC property (database items). |

5.7.3.2 The <ITEMS> tag

The <ITEMS>...</ITEMS> pair marks the start and end of a list of items to be included in the in the choice item. If a datasrc is specified, the <ITEMS> section is ignored.

APPENDIX "A": ARML SPECIFICATION

5.7.3.3 The <I> tag

The <I>...</I> pair marks the start and end of an individual item in the choice items list. It has the following attributes:

| Attribute | Optional? | Description |
|---|---|---|
| ID | Yes | An id used to identify this item in the list. |

The value between the pair is the text value that is to be displayed in the choice item.

5.7.3.4 The <EVENTS> tag

The <EVENT>...</EVENT> pair marks the start and end of a user-interface level event definition. See section 6 for a detailed discussion of the Smart Client event model.

5.7.3.5 The <EVENT> tag

The <EVENT>...</EVENT> pair marks the start and end of a user-interface level event definition. See section 6 for a detailed discussion of the Smart Client event model.

5.7.3.6 The <ACTION> tag

The <ACTION>...</ACTION> pair marks the start and end of an action definition. See section 6 for a detailed discussion of the Smart Client event model.

5.8 Checkboxes definition section

5.8.1 Description

The checkboxes section describes a check box that appears on a given screen.

5.8.2 Structure

The checkboxes section has the following structure:

```
{wrapper tags}
    <CHK>
        <EVENTS>
            <EVENT>
                <ACTION>...</ACTION>
            </EVENT>
        </EVENTS>
    </CHK>
{wrapper tags}
```

5.8.3 Tags

5.8.3.1 The CHK tag

The <CHK>...</CHK> pair marks a check box definition

| Attribute | Optional? | Description |
|---|---|---|
| NAME | No | An identifier for the check box. |
| INDEX | No | The index of this control with respect to the list of all controls on the screen. |
| CAPTION | No | The text to be displayed for this check box if the DATASRC is not available or is not specified. |
| Save | No | Boolean value indicating whether or not to save the value in this field to temporary storage for use by other screens later on. Saving the value to the |

APPENDIX "A": ARML SPECIFICATION

|  |  | scratchpad is triggered by either exiting the screen or by an explicit 'SAVE' action on a user interface control. |
|---|---|---|
| SAVENAME | Yes | If present, the name to save the field under in the scratchpad. This attribute has no meaning unless the SAVE attribute is set to 'Yes' |
| X | Yes | The X-coordinate of the check box on the screen. This attribute may not be meaningful in some display environments, in which case it would be skipped without processing by the parser |
| Y | Yes | The Y-coordinate of the check box on the screen. This attribute may not be meaningful in some display environments, in which case it would be skipped without processing by the parser |
| HT | Yes | The Height of the Checkbox. This attribute may not be meaningful in some display environments, in which case it would be skipped without processing by the parser |
| WT | Yes | The Width of the Checkbox. This attribute may not be meaningful in some display environments, in which case it would be skipped without processing by the parser |
| DATASRC | Yes | If present, the query and field in the query that populates this check box. This is given in the format "query.field". |
| VALUE | Yes | If present, specifies the initial state of the check box ('TRUE' = checked, 'FALSE' = Unchecked. If unspecified, FALSE is the default value. |
| READONLY | Yes | If "TRUE" the check box cannot be modified. "FALSE" is the default value. |

5.8.3.2 The <EVENTS> tag

The <EVENT>...</EVENT> pair marks the start and end of a user-interface level event definition. See section 6 for a detailed discussion of the Smart Client event model.

5.8.3.3 The <EVENT> tag

The <EVENT>...</EVENT> pair marks the start and end of a user-interface level event definition. See section 6 for a detailed discussion of the Smart Client event model.

5.8.3.4 The <ACTION> tag

The <ACTION>...</ACTION> pair marks the start and end of an action definition. See section 6 for a detailed discussion of the Smart Client event model.

*5.9 Listboxes definition section*
5.9.1 Description

The listboxes section describes a list box that appears on a given screen.

5.9.2 Structure

The listboxes section has the following structure;

```
{wrapper tags}
     <LB>
            <EVENTS>
                   <EVENT>
                          <ACTION> ... </ACTION>
                   </EVENT>
            </EVENTS>
            <ITEMS>
                   <I> ... </I>
            </ITEMS>
     </LB>
{wrapper tags}
```

APPENDIX "A": ARML SPECIFICATION

5.9.3 Tags

5.9.3.1 The LB tag

The <LB>...</LB> pair marks a list box definition

| Attribute | Optional? | Description |
|---|---|---|
| NAME | No | An identifier for the list box. |
| INDEX | No | The index of this control with respect to all of the controls on the screen. |
| CAPTION | No | The text to be displayed as the title of this list box, where applicable. |
| SAVE | No | Boolean value indicating whether or not to save the value in this field to temporary storage for use by other screens later on. Saving the value to the scratchpad is triggered by either exiting the screen or by an explicit 'SAVE' action on a user interface control. |
| SAVENAME | Yes | If present, the name to save the field under in the scratchpad. This attribute has no meaning unless the SAVE attribute is set to 'Yes' |
| X | Yes | The X-coordinate of the list box on the screen. This attribute may not be meaningful in some display environments, in which case it would be skipped without processing by the parser |
| Y | Yes | The Y-coordinate of the list box on the screen. This attribute may not be meaningful in some display environments, in which case it would be skipped without processing by the parser |
| HT | Yes | The Height of the Listbox. This attribute may not be meaningful in some display environments, in which case it would be skipped without processing by the parser |
| WT | Yes | The Width of the Listbox. This attribute may not be meaningful in some display environments, in which case it would be skipped without processing by the parser |
| DATASRC | Yes | If present, the query and field in the query that populates this list box. This is given in the format "query.field". |
| IDDATASRC | Yes | If present, the query and field in the query that populates the list box Ids. This is given in the format "query.field". This value will create a list of ID values that correspond to the list box values in DATASRC. I.e. they should create a value, id pair. |
| READONLY | Yes | If "TRUE" the list box cannot be modified. "FALSE" is the default. |
| SI | Yes | The value to indicate which item of the choice item is to be selected when loaded. This value will be compared with the ID property (hard-coded items) or the IDDATASRC property (database items). |

5.9.3.2 The <ITEMS> tag

The <ITEMS>...</ITEMS> pair marks the start and end of a list of items to be included in the in the list box. If a datasrc is specified, the <ITEMS> section is ignored.

5.9.3.3 The <I> tag

The <I>...</I> pair marks the start and end of an individual item in the list box items list. It has the following attributes:

| Attribute | Optional? | Description |
|---|---|---|
| ID | Yes | An id used to identify this item in the list. |

The value between the pair is the text value that is to be displayed in the list box. Can be a scratchpad or query value of the form [SP.screen.savename] or [QU.query.field].

APPENDIX "A": ARML SPECIFICATION

5.9.3.4 The <EVENTS> tag

The <EVENT>...</EVENT> pair marks the start and end of a user-interface level event definition. See section 6 for a detailed discussion of the Smart Client event model.

5.9.3.5 The <EVENT> tag

The <EVENT>...</EVENT> pair marks the start and end of a user-interface level event definition. See section 6 for a detailed discussion of the Smart Client event model.

5.9.3.6 The <ACTION> tag

The <ACTION>...</ACTION> pair marks the start and end of an action definition. See section 6 for a detailed discussion of the Smart Client event model.

5.10 Grids

5.10.1 Description

Grids allow data to be displayed in row-column format. Grids can display data from a data source (query) or they can contain hard coded values. Each column in a grid can be visible or hidden. Hidden values are maintained, but not visible to the user.

5.10.2 Structure

The grids section has the following structure;

```
{wrapper tags}
     <GRID>
           <COLS>
                  <COL> ... </COL>
           </COLS>
           <ROWS>
                  <R>
                         <V> ... </V>
                  </R>
           </ROWS>
     </GRID>
{wrapper tags}
```

5.10.3 Tags

5.10.3.1 GRID Tag

<GRID>...</GRID> The grid item itself will have the following attributes

| Attribute | Optional? | Description |
| --- | --- | --- |
| NAME | No | An identifier for the edit box. |
| INDEX | No | The order in which the edit box appears |
| X | Yes | The X-coordinate of the edit box on the screen. This attribute may not be meaningful in some display environments, in which case it would be skipped without processing by the parser |
| Y | Yes | The Y-coordinate of the edit box on the screen. This attribute may not be meaningful in some display environments, in which case it would be skipped without processing by the parser |
| HT | Yes | The Height of the Edit Box. This attribute may not be meaningful in some display environments, in which case it would be skipped without processing |

APPENDIX "A": ARML SPECIFICATION

| | | by the parser |
|---|---|---|
| WT | Yes | The Width of the Edit Box. This attribute may not be meaningful in some display environments, in which case it would be skipped without processing by the parser |
| GRDSRC | Yes | This is the Query on the screen that will provide the data to the grid. No field name will be specified in this value |

5.10.3.2 COLS Tag

<COLS>...</COLS> This tag contains no attributes. But instead contains all the columns that are associated with the grid in the order in which they appear from left to right.

5.10.3.3 COL Tag

<COL>...</COL> This tag will determine the column specification for the grid. The attributes for this item are the following:

| Attribute | Optional? | Description |
|---|---|---|
| CAPTION | Yes | This is the caption that appears at the top of the grid where applicable. |
| FIELDNAME | Yes | This field name represents the Field to pull information from out of the GRDSRC of the grid control. |
| SAVE | No | This true false value will be checked when the SAVE action is called to save values to the scratchpad |
| SAVENAME | Yes | This is the name in which the data will be saved when the SAVE action is called and the column is marked for Saving |
| WT | Yes | The Width of the Edit Box. This attribute may not be meaningful in some display environments, in which case it would be skipped without processing by the parser |

5.10.3.4 ROWS Tag

<ROWS>...</ROWS> This will Indicate any hard coded rows that would be created in the design studio. It does not contain any attributes but instead contains all the row definitions.

5.10.3.5 R Tag

<R>...</R> This is the row declaration that contains all the values for the row that has been hard coded. It has no attributes itself, but contains the value definitions for the row.

5.10.3.6 V Tag

<V>...</V> This definition contains the data that is related to the ROW and to the column.

5.10.4 Example

An example of a grid declaration is as follows:

```
<GRID INDEX="2" NAME="mygrid" X="10" Y="50" HT="100" WT="100" GRDSRC="QUERY1">
<COLS>
<COL CAPTION="Id" FIELDNAME="lngID" SAVE="TRUE" SAVENAME="lngID" WT="20"></COL>
<COL CAPTION="Subject" FIELDNAME="strSubject" SAVE="TRUE" SAVENAME="Sub" WT="80"></COL>
</COLS>
<ROWS>
  <R>
    <V>343432</V>
    <V>This is a subject</V>
```

APPENDIX "A": ARML SPECIFICATION

```
    </R>
    <R>
      <V>5456</V>
      <V>This is another subject</V>
    </R>
  </ROWS>
</GRID>
```

6 THE SMART CLIENT EVENT MODEL

The Smart Client has a set of actions that it ties to events. Events can occur at the application level, the screen level or the user interface item level; an application level event is listened for throughout the operation of the application, a screen level event is listened for while the screen is displayed, and so on. If an action for an event is defined at multiple levels, the lowest level has precedence; i.e., user interface actions override screen level actions, which override application level actions. An attempt to list an event multiple times at the same level (application, screen, item) is invalid and will generate an error message.

The following ARML fragment illustrates this schema (tags and attributes not relevant to the event model have been omitted);

```
<AXTSCHDEF>
    <EVENTS>
        <EVENT>
            <ACTION>...</ACTION>
            <ACTION>...</ACTION>
        <EVENTS>
        <EVENT>
            <ACTION>...</ACTION>
        </EVENT>
    </EVENTS>
    <INTERFACE>
        <SCREEN>
            <EVENT>
                <ACTION>...</ACTION>
            </EVENT>
            <EVENT>
                <ACTION>...</ACTION>
            </EVENT>
            <BUTTON>
                <EVENT>
                    <ACTION>...</ACTION>
                </EVENT>
                <EVENT>
                    <ACTION>...</ACTION>
                </EVENT>
            </BUTTON>
        </SCREEN>
    </INTERFACE>
</AXTSCHDEF>
```

6.1 The EVENTS tag

The <EVENTS>...</EVENTS> pair marks the start and end of the events section. It has no attributes.

6.2 The EVENT tag

The <EVENT>...</EVENT> pair marks the start and end of an event definition. It has the following attributes;

APPENDIX "A": ARML SPECIFICATION

| Attribute | Optional? | Description |
|---|---|---|
| TYPE | No | The type of event that should be performed when the button is pushed. Allowed values are; BUTTONCLICK MENUITEMSELECTED DATA |

6.2.1 The BUTTONCLICK event
The button click event occurs when the user selects a button. It has no attributes.

6.2.2 The MENUITEMSELECTED event
The menu items selected event occurs when the user selects a menu item. It has no attributes.

6.2.3 The DATA event
The data event occurs when ARML data is received from the wireless interface. It has the following attributes;

| Attribute | Optional? | Description |
|---|---|---|
| NAME | No | The identifier of the specific package |

6.3 The ACTION tag

The <ACTION>...</ACTION> pair marks the start and end of an event definition. It has one fixed attribute, and a number of attributes that may or may not appear depending on the type of action required. The fixed attribute is;

| Attribute | Optional? | Description |
|---|---|---|
| TYPE | No | The type of action that should be performed when the button is pushed. Allowed values are; OPEN ARML SAVE PURGE NOTIFY CLOSE ALERT IF...Then...Else CLOSESCREEN REFRESH SAVEITEM |

6.3.1 The OPEN action
The open action tells the Smart Client to open a new screen. It adds one extra attribute to the ACTION tag;

| Attribute | Optional? | Description |
|---|---|---|
| NAME | No | The name of the screen to open |
| NEWINST | Yes | If true, a new instance of the screen is created. If false, the least recently used instance of the screen is opened and the data is not refreshed. True is the default. |

APPENDIX "A": ARML SPECIFICATION

6.3.2 The ARML action
The arml action tells the Smart Client to compose and send an arml package. It does not add any attributes to the ACTION tag, but has the following subtag;

<ARMLTEXT>

Contained between the <ARMLTEXT>...</ARMLTEXT> pair is one of the application-defined data packages. Individual data items are marked with the user interface item that their value should be taken from, in the format "[SP.*screen.savename*]", or [QU.*query.field*]. If *screen* is not the current screen, then the Smart Client will look for the data in its scratchpad. See section 0 for an example of the ARML action.

6.3.3 The SAVE action
The save action tells the Smart Client to save all fields marked as persistent (i.e., they are defined with SAVE="Yes") to be saved to the scratchpad area. It has no attributes.

6.3.4 The PURGE action
The purge action tells the Smart Client to clear all fields that have been saved to the scratchpad. It has no attributes.

6.3.5 The NOTIFY action
The notify action tells the Smart Client to activate the configured notification on a device. For devices where this has no meaning, it will cause a beep to be played. It has no attributes.

6.3.6 The CLOSE action
The close action tells the Smart Client to close the application. It has no attributes.

6.3.7 The ALERT action
The alert action tells the Smart Client to display an alert item (e.g., a message box on Windows, an alert box on the RIM pager, an alert card on WAP). It has the following attributes;

| Attribute | Optional? | Description |
| --- | --- | --- |
| CAPTION | Yes | The caption to display in the title bar of the message box |
| TEXT | Yes | The text to display in the message box |

6.3.8 The INTEGRATION action
The integration action tells the Smart Client to pass data to an interface exposed on a device. For example a COM interface on Pocket PC. This action will allow the developer to pass a parameter into an exposed method and then also save the result of that method in a global scratchpad value. The contents of the integration action's element are the input values to be passed to the interface. It has the following attributes;

| Attribute | Optional? | Description |
| --- | --- | --- |
| CLSID | No | This is the class identifier of the component that is to be called. |
| SAVE | No | This tells the smart client if it should save the result into a global scratchpad value or not. |

APPENDIX "A": ARML SPECIFICATION

| SAVENAME | Yes | This is the name of the global scratchpad value |

Example ARML:

<ACTION TYPE="*INTEGRATION*" CLSID="*AirixSignature.AirixSignatureCtrl*"
SAVENAME="" SAVE="*FALSE*">*[SP.\*.SIGNATURE]*</ACTION>

6.3.9 The CLOSESCREEN action
The close screen action tells the Smart Client to close all open instances of the screen specified by name in the NAME attribute. This action has the following attributes:

| Attribute | Optional? | Description |
|---|---|---|
| NAME | No | Name of the screen to close. |

6.3.10 The REFRESH action
The refresh action tells the Smart Client to re-run any queries and re-initialize all UI elements on the screen with the name specified by the NAME attribute. If there are multiple open instances of the screen, all open instances will be refreshed. The refresh action has the following attributes:

| Attribute | Optional? | Description |
|---|---|---|
| NAME | No | Name of the screen to refresh. |

6.3.11 The SAVEITEM action
The saveitem action tells the Smart Client to create a new scratchpad item or to edit an existing scratchpad item. The value of the scratchpad item is defined within the <ACTION>...</ACTION> tags. The saveitem action has the following attributes:

| Attribute | Optional? | Description |
|---|---|---|
| SPN | No | Name of the scratchpad item to create or modify. |

6.3.12 The IF Action
This action will contain two lists of actions. One a list of actions to perform if the condition evaluates to TRUE (IFLIST), and another list of actions to perform if the condition evaluates to FALSE (ELSEIFLIST).

The structure of the action is as follows:
```
<ACTION TYPE="IF>
        <COND EVAL="parameter" TYPE="condition type" VALUE="literal">
        </COND>
        <IFLIST>
                <ACTION></ACTION>
        </IFLIST>
        <ELSEIFLIST>
                <ACTION></ACTION>
        </ELSEIFLIST>
</ACTION>
```

6.3.12.1 Conditions (COND)
Conditions are used in conjunction with the IF Action. Conditions are specified as follows:

APPENDIX "A": ARML SPECIFICATION

| Attribute | Optional? | Description |
|---|---|---|
| EVAL | NO | Specifies the parameter to be evaluated. Can be hard coded, scratchpad, or query values. It is the "input" to the function. |
| TYPE | NO | Specifies the type of the condition. Possible values are:<br>LESSTHAN<br>MORETHAN<br>EQUALS<br>ISNUMERIC<br>ISALPHA<br>ISEMAIL<br>ISFORMAT<br>MAXCHARS<br>MINCHARS |
| VALUE | Depends on TYPE | The value that EVAL will be evaluated against. Not relevant for all conditions. |

The following is a description of each of the supported conditions:
- EQUALS, this function will take an input and a value to evaluate the input against. If the two items are determined to be Equal, the condition will return true. If they are not equal, the condition will return false. The value and the input must be of the same data type, otherwise the condition will return false. Memo values will be treated as a string and auto-increment types will be treated as integers. The following criteria will be used to determine equality:
    o Two strings are equal if each of the characters in the strings is identical and the strings have the same number of characters. The string comparison will not be case sensitive.
    o Two integers are equal if their values are mathematically equal.
- MORETHAN, this function will take an input and a value to evaluate the input against. If the input is determined to be greater in value than the evaluation value, the condition will return true. If the values are equal, false is returned. If the evaluation value is determined to be greater than the input, the function will return false. The evaluation value and the input must be of the same data type, otherwise an error condition will occur. Memo values will be treated as a string and the auto-increment type will be treated as an integer. The following criteria will be used to determine which value is greater:
    o String A is more in value than String B if String A occurs before String B in alphabetical order.
    o Integer A is greater than Integer B if A > B, mathematically.
- LESSTHAN, this function will take an input and a value to evaluate the input against. If the input is determined to be lesser in value than the evaluation value, the condition will return true. If the values are equal, false is returned. If the evaluation value is determined to be lesser than the input, the function will return false. The evaluation value and the input must be of the same data type, otherwise an error condition will occur. Memo values will be treated as a string and the auto-increment type will be treated as an integer. The following criteria will be used to determine which value is greater:
    o String A is lesser in value than String B if String A occurs after String B in alphabetical order.
    o Integer A is greater than Integer B if A < B, mathematically.

APPENDIX "A": ARML SPECIFICATION

- ISNUMERIC, this function will take an input and evaluate whether or not it is a value number. If the input can be converted successfully to a number, the function will return true. If the input cannot be converted to a number, the function will return false. All input values will be treated as a string data type.
- ISALPHA, this function will take an input and evaluate whether or not it contains only alphabetic characters. Alphabetic characters are defined as all characters from A-Z, a-z,, and spaces. All input values will be treated as a string data type.
- ISEMAIL, this function will take an input and evaluate whether or not it contains a string of the form *something@something*. All input values will be treated as a string data type.
- ISFORMAT, this function will take an input and a value to evaluate the input against. If the input is determined to be formatted as the evaluation value, the condition will return true. If the evaluation value is determined to be formatted differently than the input, the function will return false. The evaluation value must comply with the ARML formatting standards.
- MAXCHARS, this function will take an input and evaluate whether or not the number of characters in the string is less than or equal to the evaluation value passed into the function. If the number of characters in the string is less than or equal to the evaluation value, true is returned. If the number of characters in the string is greater than the evaluation value, false is returned. All input values will be treated as a string data type.
- MINCHARS, this function will take an input and evaluate whether or not the number of characters in the string is greater than or equal to the evaluation value passed into the function. If the number of characters in the string is greater than or equal to the evaluation value, true is returned. If the number of characters in the string is less than the evaluation value, false is returned. All input values will be treated as a string data type.

Example:
```
<ACTION TYPE="IF">
      <COND EVAL="[QUERY1.STRREAD]" TYPE="EQUALS" VALUE="READ"></COND>
      <IFLIST>
            <ACTION TYPE="SAVE"></ACTION>
            <ACTION TYPE="OPEN" NAME="INBOX" NEWINST="FALSE"></ACTION>
      </IFLIST>
      <ELSELIST>
            <ACTION TYPE="OPEN" NAME="MSGREAD" NEWINST="FALSE"></ACTION>
      </ELSELIST>
</ACTION>
```

*Example of airix event model*

The following example serves to illustrate how a screen is used to compose a data package to be sent back to the AIRIX server. The example used is a screen giving the bare functionality for composing a basic email message – to simplify the example, the user cannot cancel the action, and multiple recipients are not allowed.

```
<ARML>
```

APPENDIX "A": ARML SPECIFICATION

```
<SCREEN NAME="NewMsg">
    <BUTTONS>
        <BTN NAME="OK" CAPTION="Send" INDEX="0">
            <EVENTS>
                <EVENT TYPE="MODIFY">
                    <ACTION TYPE="ARML">
                        <ARMLTEXT>
                            <BODY TYPE="ME">
                                <ME MSGID="1" FROM="Tim Neil"
                                    SUBJECT="[SP.NewMsg.Subject]">
                                    <DATA>[SP.NewMsg.Body]</DATA>
                                    <RECIPS>
                                        <RCP MSGID="1"
                                            TO="[SP.NewMsg.To]"></RCP>
                                    </RECIPS>
                                </ME>
                            </BODY>
                        </ARMLTEXT>
                    </ACTION>
                </EVENT>
            </EVENTS>
        </BTN>
    </BUTTONS>
    <EDITBOXES>
        <EB NAME="To" INDEX="1"></EB>
        <EB NAME="Subject" INDEX="2"></EB>
        <EB NAME="Body" INDEX="3"></EB>
    </EDITBOXES>
</SCREEN>
</ARML>
```

The Editboxes section at the bottom defines 3 editboxes, with the names of 'To', 'Subject', and 'Body';

```
<EB NAME="To" INDEX="1"></EB>
<EB NAME="Subject" INDEX="2"></EB>
<EB NAME="Body" INDEX="3"></EB>
```

There is one button on the screen, with the name of 'OK';

```
<BTN NAME="OK" CAPTION="Send" INDEX="0">
```

When the user clicks on OK, the button composes an ARML package to be sent to the AIRIX server;

```
<EVENT>
    <ACTION TYPE="ARML">
```

The ARML package sent is an 'ME' package as described in the example in section 4.2.1. It is composed as follows;

```
<BODY TYPE="ME">
    <ME MSGID="1" FROM="Tim Neil"
        SUBJECT="[SP.NewMsg.Subject]">
        <DATA>[SP.NewMsg.Body]</DATA>
        <RECIPS>
            <RCP MSGID="1" TO="[SP.NewMsg.To]"></RCP>
```

APPENDIX "A": ARML SPECIFICATION

```
        </RECIPS>
    </ME>
</BODY>
```

The subject field is taken from the edit box named 'Subject';

```
<ME MSGID="1" FROM="Tim Neil" SUBJECT="[SP.NewMsg.Subject]">
```

The recipients field is taken from the edit box named 'Subject';

```
<RECIPS>
    <RCP MSGID="1" TO="[SP.NewMsg.To]"></RCP>
</RECIPS>
```

Finally the text of the message is filled from the 'Body' field;

```
<DATA>[SP.NewMsg.Body]</DATA>
```

7 AVM-SERVER SYSTEM INTERACTIONS

This section describes the primitives that are used for system-level interactions that the AIRIX Smart Client has with the AIRIX server.

7.1 General

7.1.1 Description

System level packages are sent between AIRIX and the AVM (wirelessly).

7.1.2 Structure

System interactions are performed by exchanging ARML data packages with the following structure;

```
<ARML>
<HEAD>...</HEAD>
<SYS>
{data}
</SYS>
</ARML>
```

7.1.3 Tags

7.1.3.1 The <HEAD> tag

The package header is delimited by the <HEAD>...</HEAD> tags. Contained in text between the two tags is the id of the destination mobile. The HEAD tag has the following attributes;

| Attribute | Optional? | Description |
|---|---|---|
| DT | No | The date & time in RFC 1123 format (including time zone) |
| ID | No | A unique ID for the message |
| VERSION | No | The version number of the application (currently "2.0") |
| APPNAME | No | The application name ("0" for System Messages) |
| DEVICE | No | A numeric constant identifying the device |
| PID | Yes | A unique value used to designate a device. |

APPENDIX "A": ARML SPECIFICATION

| AVMV | No | The version number of the Smart Client. |

7.1.3.2  The <SYS> tag

The <SYS>...</SYS> pair contains the actual system package. The tag does not have any attributes.

*7.2  Device Registration & deregistration package*
7.2.1  Description

Device registration packages are sent from the AVM to the AIRIX server when a user registers their device.

7.2.2  Structure

A device registration package has the following structure;

```
{wrapper tags}
<REG>
      <USERNAME> {data} </USERNAME>
      <PASSWORD> {data} </PASSWORD>
</REG>
{wrapper tags}
```

7.2.3  Tags

7.2.3.1  The <REG> tag

The <REG>...</REG> pair delimit the registration request. The tag has no attributes.

7.2.3.2  The <USERNAME> tag

The <USERNAME>...</ USERNAME > pair contain the user name. The tag does not have any attributes.

7.2.3.3  The <PASSWORD> tag

The <PASSWORD>...</PASSWORD> pair contain the password. The tag does not have any attributes.

7.2.4  Example

This package would be sent by a user, to register their device under a given name;

```
{wrapper tags}
<REG>
      <USERNAME>SUNTRESS</USERNAME>
      <PASSWORD>MYPASS</PASSWORD>
</REG>
{wrapper tags}
```

APPENDIX "A": ARML SPECIFICATION

7.3 Registration confirmation package

7.3.1 Description

This packages is sent back from the AIRIX server to the AVM to confirm that the device has been registered.

7.3.2 Structure

A registration confirmation package has the following structure;

```
{wrapper tags}
<REGCONFIRM>
      <VALUE> {data} </VALUE>
      <APPS>
            <APP></APP>
            <APP></APP>
      </APPS>
</REGCONFIRM>
{wrapper tags}
```

7.3.3 Tags

7.3.3.1 The <REGCONFIRM> tag

The <REGCONFIRM>...</REGCONFIRM> pair delimit the confirmation. The tag has no attributes.

7.3.3.2 The <VALUE> tag

The <VALUE>...</VALUE> pair contains the status of the registration request. The following text strings are allowable;

CONFIRM – this means that the registration request was successful
NOTREGPLATFORM – this means that the registration request failed because the device is not registered for the platform
INVALIDUSERPASS – this means that the registration request failed because the user name or password was not valid
NODEVICE – this means that the registration request failed because the device was not registered previously by an application

7.3.3.3 The <APPS> tag

The <APPS>...</APPS> pair contains a list of applications for the device.

7.3.3.4 The <APP> tag

The <APP>...</APP> pair contains an application header. It has the following attributes;

| Attribute | Optional? | Description |
| --- | --- | --- |
| ID | No | The application ID |
| NAME | No | The name of the application |
| DESCRIPTION | No | A text description of the application |
| REG | No | 'YES' if the user is registered for this application. 'NO' if they are not. |

APPENDIX "A": ARML SPECIFICATION
7.3.4 Example
This package would be sent to confirm the example request in section 7.2.4;

```
{wrapper tags}
<REGCONFIRM>
    <VALUE>CONFIRM</VALUE>
    <APPS>
       <APP ID="4" NAME="EMAIL" DESCRIPTION="E-Mail Application"
    REG="YES">
       <APP ID="22" NAME="STOCKS" DESCRIPTION="Stock Quotes" REG="NO">
    </APPS>
</REGCONFIRM>
{wrapper tags}
```

APPENDIX "A": ARML SPECIFICATION

7.4 Find applications package

7.4.1 Description

Find applications packages are sent from the AIRIX component to the AIRIX server when a user wishes to refresh their list of applications on a device

7.4.2 Structure

A device registration package has the following structure;

```
{wrapper tags}
<FINDAPPS>
</FINDAPPS>
{wrapper tags}
```

7.4.3 Tags

7.4.3.1 The <FINDAPPS> tag

The <FINDAPPS>...</FINDAPPS> pair delimit the application registration request. It has no attributes.

APPENDIX "A": ARML SPECIFICATION

7.5 Find applications confirmation package
7.5.1 Description
This package is sent back from the AIRIX server to the AVM to and contains a list of applications available for the user

7.5.2 Structure
A registration confirmation package has the following structure;

```
{wrapper tags}
<FINDAPPSCONFIRM>
     <APPS>
          <APP></APP>
          <APP></APP>
     </APPS>
</FINDAPPSCONFIRM>
{wrapper tags}
```

7.5.3 Tags

7.5.3.1 The <FINDAPPSCONFIRM> tag
The <FINDAPPSCONFIRM>...</FINDAPPSCONFIRM> pair delimit the confirmation. The tag has no attributes.

7.5.3.2 The <APPS> tag
The <APPS>...</APPS> pair contains a list of applications for the device.

7.5.3.3 The <APP> tag
The <APP>...</APP> pair contains an application header. It has the following attributes;

| Attribute | Optional? | Description |
| --- | --- | --- |
| ID | No | The application ID |
| NAME | No | The name of the application |
| DESCRIPTION | No | A text description of the application |
| REG | No | 'YES' if the user is registered for the application. 'NO' if they are not. |

APPENDIX "A": ARML SPECIFICATION

7.6 Application Registration & deregistration package

7.6.1 Description

Application registration packages are sent from the AIRIX component to the AIRIX server when a user wishes to register or deregister for an application.

7.6.2 Structure

A device registration package has the following structure;

```
{wrapper tags}
<APPREG>
</APPREG>
{wrapper tags}
```

7.6.3 Tags

7.6.3.1 The <APPREG> tag

The <APPREG>...</APPREG> pair delimit the application registration request. The tag has the following attributes;

| Attribute | Optional? | Description |
| --- | --- | --- |
| TYPE | No | This defines the type of parameter. It can take two values;<br>ADD – this means that the application is to be added to the registration database<br>DELETE – this means that the application is to be removed to the registration database |
| ID | No | The ID of the application being registered/deregistered |

APPENDIX "A": ARML SPECIFICATION

7.7 Application registration & deregistration confirmation package
7.7.1 Description
This packages is sent back from the AIRIX server to the AVM to confirm that the applicaiton has been registered or deregistered.

7.7.2 Structure
A registration confirmation package has the following structure (note that for DELETE types, the <INTERFACE>...</INTERFACE> section will not be included);

```
{wrapper tags}
<APPREGCONFIRM>
      <INTERFACE>
            interface definition
      </INTERFACE>
</APPREGCONFIRM>
{wrapper tags}
```

7.7.3 Tags

7.7.3.1 The <APPREGCONFIRM> tag
The <APPREGCONFIRM>...</APPREGCONFIRM> pair delimit the confirmation. The tag has the following attributes;

| Attribute | Optional? | Description |
|---|---|---|
| TYPE | No | This defines the type of parameter. It can take two values; ADD – this means that the application is to be added to the registration database DELETE – this means that the application is to be removed to the registration database |
| ID | Yes | The ID of the application being returned (if any) |

7.7.3.2 The <INTERFACE> tag
The <INTERFACE>...</INTERFACE> pair delimit the interface definition. The tag has the no attributes, and contains an interface definition as laid out in section 3. Note that instead of the <DEVICES>...</DEVICES> tags in section 3.1.3.6, it will be replaced by <SCREENS>...<SCREENS> with the screen definitions for only the one device that the interface is being sent to (see section 3.4.3.2 for the definition of the <SCREENS> tag). This section will not be sent for APPREGCONFIRM messages of TYPE="DELETE".

7.7.4 Example
The following example shows the application confirmation with screen definitions for an application that allows a user to view their inbox and the mails in it.

```
{wrapper tags}
<APPREGCONFIRM TYPE="ADD" ID="12">
      <INTERFACE>
            <AXSCHDEF>
                  <EVENTS>
                        <EVENT>
                              (action definitions)
                        </EVENT>
                  </EVENTS>
```

APPENDIX "A": ARML SPECIFICATION

```
            <AXTDEFS>
                    (table definitions)
            </AXTDEFS>
            <DPACKETS>
                    (data package definitions)
            </DPACKETS>

<SCREENS>
                    <SCREEN NAME="INBOX ">
                            {screen definition}
                    </SCREEN>
                    <SCREEN NAME="VIEWNEWMAIL">
                            {screen definition}
                    </SCREEN>
            </SCREENS>
        </AXSCHDEF>
    </INTERFACE>
</APPREGCONFIRM>
{wrapper tags}
```

APPENDIX "A": ARML SPECIFICATION

7.8 Setting the active device package
7.8.1 Description
If a user wishes to set the current device as their active device, the AVM must send a 'set active device' package to the AIRIX server

7.8.2 Structure
A 'set active device' package has the following structure;

```
{wrapper tags}
<SA>
{data}
</SA>
{wrapper tags}
```

7.8.3 Tags

7.8.3.1 The <SA> tag
The 'set active device' package is shown by the <SA>...</SA> tags. The tag has no attributes; the tag pair contains the user's username

7.8.4 Example
This package would be sent by a user with the username of 'scotty';

```
{wrapper tags}
<SA>scotty</SA>
{wrapper tags}
```

7.9 Set active device response
7.9.1 Description
This packages is sent back from the AIRIX server to the client in response to a request to set the current device as the active one.

7.9.2 Structure
A 'set active device response' package has the following structure;

```
{wrapper tags}
<SACONFIRM>
      <VALUE> {data} </VALUE>
</SACONFIRM>
{wrapper tags}
```

7.9.3 Tags

7.9.3.1 The <SACONFIRM> tag
The <SACONFIRM>...</SACONFIRM> pair delimit the confirmation. The tag does not have any attributes.

APPENDIX "A": ARML SPECIFICATION
7.9.3.2 The <VALUE> tag

The <VALUE>...</VALUE> pair contains the status of the registration request. The following text strings are allowable;

CONFIRM – this means that the registration request was successful
NOTREGISTERED – this means that the registration request failed because

7.9.4 Example
This package would be sent by the AIRIX server to confirm a set active request;

```
{wrapper tags}
<SACONFIRM>
     <VALUE>CONFIRM</VALUE>
</SACONFIRM>
{wrapper tags}
```

7.10 Invalid Application package
7.10.1 Description
This package is sent back from the AIRIX server to the AVM in response to a request to interact with an application that is no longer registered with AIRIX.

7.10.2 Structure
An 'invalid application' package has the following structure;

```
{wrapper tags}
<NOAPP>
     <VALUE> {data} </VALUE>
</NOAPP>
{wrapper tags}
```

7.10.3 Tags

7.10.3.1 The <NOAPP> tag
The <NOAPP>...</NOAPP> pair delimit the confirmation. The tag has no attributes.

7.10.3.2 The <VALUE> tag
The <VALUE>...</VALUE> pair delimit the return code. It can only be
NOAPPLICATION – Application not found.

7.10.4 Example
This package would be sent in response to a request if the application cannot be found;

```
{wrapper tags}
<NOAPP>
     <VALUE>NOAPPLICATION</VALUE>
</NOAPP>
{wrapper tags}
```

APPENDIX "A": ARML SPECIFICATION
8 APPLICATION-SERVER SYSTEM INTERACTIONS

The section that defines Application to server system interactions has been made obsolete by the document "AIRIX Polling XML Language Specification". It describes an XML-HTTP interface to AIRIX using POST and GET commands to a web-based ISAPI DLL.

9 ARML FUTURE DEVELOPMENTS

The following enhancements to ARML are planned;

- Tokenisation
- Support for on-line help
- Compression techniques
- Enhanced editboxes
    - input masks
    - multi-value entry
- Multiple selection list boxes
- A per-application splash screen

APPENDIX B – EXEMPLARY APPLICATION DEFINITION DOCUMENT

```xml
1  <?xml version="1.0"?>
2  <!DOCTYPE ARML PUBLIC "-//NEXTAIR//DTD ARML 1.0//EN" "http://www.nextair.com/DTD/ARML_1.0.xml">
3  <ARML>
4  <AXSCHDEF APPNAME="StockTicker" VERSION="11.2" DESC="New Stock Ticker" ARMLMAJOR="2" ARMLMINOR="0">
5
6    <AXTDEFS>
7      <TDEF NAME="TBLStockQuotes" PK="ID" DELINDEX="0">
8        <FIELDS>
9          <FLD TYPE="AUTOINC" SIZE="1"  INDEXED="YES" ALLOWNULL="NO">ID</FLD>
10         <FLD TYPE="STRING"  SIZE="50" INDEXED="NO"  ALLOWNULL="YES">LastAskPrice</FLD>
11         <FLD TYPE="STRING"  SIZE="50" INDEXED="NO"  ALLOWNULL="YES">TodayHighPrice</FLD>
12         <FLD TYPE="STRING"  SIZE="50" INDEXED="NO"  ALLOWNULL="YES">TodayLowPrice</FLD>
13         <FLD TYPE="STRING"  SIZE="50" INDEXED="NO"  ALLOWNULL="YES">PreviousClose</FLD>
14         <FLD TYPE="STRING"  SIZE="50" INDEXED="NO"  ALLOWNULL="YES">ShareVolume</FLD>
15       </FIELDS>
16     </TDEF>
17   </AXTDEFS>
18   <DPACKETS>
19     <AXDATAPACKET BODY="RES" UPDATELOCALDATA="YES" SENDTOAPP="NO">
20       <TABLEUPDATES>
21         <TUPDATE TABLE="TBLStockQuotes" UPDATETYPE="DELETE" WHEREFIELD="" WHEREPARAM=""
22           SECTION="RES" MULTIROW="NO" MULTIROWIDENT="">
23         </TUPDATE>
24         <TUPDATE TABLE="TBLStockQuotes" UPDATETYPE="ADD" WHEREFIELD="" WHEREPARAM=""
25           SECTION="RES" MULTIROW="NO" MULTIROWIDENT="">
26           <PKGFIELDS>
27             <PKGFLD NAME="LastAskPrice"   PARAMTYPE="PROP" PARAMTYPE="PROP">LA</PKGFLD>
28             <PKGFLD NAME="TodayHighPrice" PARAMTYPE="PROP" PARAMTYPE="PROP">TH</PKGFLD>
29             <PKGFLD NAME="TodayLowPrice"  PARAMTYPE="PROP" PARAMTYPE="PROP">TL</PKGFLD>
30             <PKGFLD NAME="PreviousClose"  PARAMTYPE="PROP" PARAMTYPE="PROP">PC</PKGFLD>
31             <PKGFLD NAME="ShareVolume"    PARAMTYPE="PROP" PARAMTYPE="PROP">SV</PKGFLD>
32           </PKGFIELDS>
33         </TUPDATE>
```

APPENDIX B – EXEMPLARY APPLICATION DEFINITION DOCUMENT

```
34              </TABLEUPDATES>
35          </AXDATAPACKET>
36      </DPACKETS>
37      <DEVICES>
38          <DEV TYPE="RIM">
39              <SCREENS SISCRN="GETQUOTE">
40                  <SCREEN NAME="GETQUOTE" TITLE="AIRIX(tm) Stock Ticker" ORDERED="FALSE">
41                      <EVENTS>
42                      </EVENTS>
43                      <MENUS>
44                          <MENU NAME="mnuMainMenu" CAPTION="Menu">
45                              <MENUITEM NAME="GetQuote" CAPTION="Get Quote" INDEX="0"
46                              READONLY="NO">
47                                  <EVENTS>
48                                      <EVENT TYPE="MENUITEMSELECTED">
49                                          <ACTION TYPE="SAVE"></ACTION>
50                                          <ACTION TYPE="OPEN" NAME="WAITSCREEN"
51                                          NEWINST="TRUE"></ACTION>
52                                          <ACTION TYPE="ARML" TTL="5">
53                                              <ARMLTEXT>
54                                                  <PKG TYPE="QR"><SYMBOL
55                                                  E="[GETQUOTE.chExch]">[GETQUOTE.edtSymbol
56                                                  ]</SYMBOL></PKG>
57                                              </ARMLTEXT>
58                                          </ACTION>
59                                      </EVENT>
60                                  </EVENTS>
61                              </MENUITEM>
62                              <MENUITEM NAME="Exit" CAPTION="Exit" INDEX="0" READONLY="NO">
63                                  <EVENTS>
64                                      <EVENT TYPE="MENUITEMSELECTED">
65                                          <ACTION TYPE="CLOSE"></ACTION>
66                                      </EVENT>
```

APPENDIX B – EXEMPLARY APPLICATION DEFINITION DOCUMENT

```
67              </EVENTS>
68            </MENUITEM>
69            <MENUITEM NAME="Sep0" CAPTION="-" INDEX="0" READONLY="NO">
70            </MENUITEM>
71            <MENUITEM NAME="About" CAPTION="About" INDEX="0" READONLY="NO">
72              <EVENTS>
73                <EVENT TYPE="MENUITEMSELECTED">
74                  <ACTION TYPE="ALERT" CAPTION="About AIRIX(tm) Stock
75                  Ticker" TEXT="AIRIX(tm) Stock Ticker Version 11
76                  Copyright(c) 2002 Nextair Corp."></ACTION>
77                </EVENT>
78              </EVENTS>
79            </MENUITEM>
80          </MENU>
81        </MENUS>
82        <EDITBOXES>
83          <EB NAME="edtSymbol" INDEX="5" CAPTION="Symbol: " TEXT=""
84          MULTILINE="NO" SAVE="YES" SAVENAME="edtSymbol" X="2" Y="6" HT="0"
85          WT="0" DATASRC="" FT="STRING" READONLY="NO"></EB>
86        </EDITBOXES>
87        <TEXTITEMS>
88          <TI NAME="NewTextItem2" INDEX="0" CAPTION="Enter the stock symbol"
89          X="19" Y="37" HT="12" WT="0"></TI>
90          <TI NAME="NewTextItem3" INDEX="1" CAPTION="and select the exchange"
91          X="60" Y="56" HT="12" WT="0"></TI>
92          <TI NAME="NewTextItem4" INDEX="2" CAPTION="you want to search." X="27"
93          Y="65" HT="12" WT="0"></TI>
94          <TI NAME="NewTextItem5" INDEX="3" CAPTION="Then select Get Quote"
95          X="21" Y="67" HT="12" WT="0"></TI>
96          <TI NAME="NewTextItem6" INDEX="4" CAPTION="from the menu." X="55" Y="3"
97          HT="12" WT="0"></TI>
98        </TEXTITEMS>
99        <CHOICEITEMS>
```

APPENDIX B – EXEMPLARY APPLICATION DEFINITION DOCUMENT

```
100         <CHOICE NAME="chExchange" INDEX="6" CAPTION="Exchange:"
101           TEXT="ChoiceItems6" SAVE="YES" SAVENAME="chExch" X="44" Y="131" HT="18"
102           WT="0" DATASRC="" IDDATASRC="" READONLY="NO">
103           <ITEMS>
104             <I ID="TSE">Toronto Stock Exchange</I>
105             <I ID="Nasdaq">Nasdaq</I>
106           </ITEMS>
107         </CHOICE>
108       </CHOICEITEMS>
109     </SCREEN>
110     <SCREEN NAME="QUOTEDETAILS" TITLE="AIRIX(tm) Stock Ticker" ORDERED="FALSE">
111       <EVENTS>
112       </EVENTS>
113       <QUERIES>
114         <QUERY NAME="qrySymbol" TABLE="TBLStockQuotes" WHEREFIELD=""
115           WHEREPARAM="" ORDERBY="" ORDERDIR=""></QUERY>
116       </QUERIES>
117       <MENUS>
118         <MENU NAME="mnuResultsMenu" CAPTION="Menu">
119           <MENUITEM NAME="NewQuote" CAPTION="New Quote" INDEX="0"
120             READONLY="NO">
121             <EVENTS>
122               <EVENT TYPE="MENUITEMSELECTED">
123                 <ACTION TYPE="CLOSESCREEN"
124                   NAME="QUOTEDETAILS"></ACTION>
125               </EVENT>
126             </EVENTS>
127           </MENUITEM>
128           <MENUITEM NAME="Exit" CAPTION="Exit" INDEX="0" READONLY="NO">
129             <EVENTS>
130               <EVENT TYPE="MENUITEMSELECTED">
131                 <ACTION TYPE="CLOSE"></ACTION>
132               </EVENT>
```

APPENDIX B – EXEMPLARY APPLICATION DEFINITION DOCUMENT

```
133         </EVENTS>
134       </MENUITEM>
135       <MENUITEM NAME="Sep0" CAPTION="-" INDEX="0" READONLY="NO">
136       </MENUITEM>
137       <MENUITEM NAME="About" CAPTION="About" INDEX="0" READONLY="NO">
138         <EVENTS>
139           <EVENT TYPE="MENUITEMSELECTED">
140             <ACTION TYPE="ALERT" CAPTION="About AIRIX(tm) Stock
141                 Ticker" TEXT="AIRIX(tm) Stock Ticker Version 11
142                 Copyright(c) 2002 Nextair Corp."></ACTION>
143           </EVENT>
144         </EVENTS>
145       </MENUITEM>
146     </MENU>
147   </MENUS>
148   <EDITBOXES>
149     <EB NAME="editLastAskPrice" INDEX="2" CAPTION="Last Ask Price: "
150         TEXT="" MULTILINE="NO" SAVE="NO" SAVENAME="" X="2" Y="30" HT="16"
151         WT="85" DATASRC="qrySymbol.LastAskPrice" FT="STRING"
152         READONLY="YES"></EB>
153     <EB NAME="editPreviousClose" INDEX="6" CAPTION="Previous Close: "
154         TEXT="" MULTILINE="NO" SAVE="NO" SAVENAME="" X="2" Y="126" HT="16"
155         WT="91" DATASRC="qrySymbol.PreviousClose" FT="STRING"
156         READONLY="YES"></EB>
157     <EB NAME="editTodayHigh" INDEX="4" CAPTION="Todays High: " TEXT=""
158         MULTILINE="NO" SAVE="NO" SAVENAME="" X="2" Y="78" HT="16" WT="78"
159         DATASRC="qrySymbol.TodayHighPrice" FT="STRING" READONLY="YES"></EB>
160     <EB NAME="editTodayLow" INDEX="3" CAPTION="Todays Low: " TEXT=""
161         MULTILINE="NO" SAVE="YES" SAVENAME="editTodayLow" X="2" Y="54" HT="16"
162         WT="74" DATASRC="qrySymbol.TodayLowPrice" FT="STRING"
163         READONLY="YES"></EB>
```

APPENDIX B – EXEMPLARY APPLICATION DEFINITION DOCUMENT

```
164             <EB NAME="editShareVolume" INDEX="5" CAPTION="Share Volume: " TEXT=""
165                 MULTILINE="NO" SAVE="NO" SAVENAME="" X="2" Y="102" HT="16" WT="85"
166                 DATASRC="qrySymbol.ShareVolume" FT="STRING" READONLY="YES"></EB>
167             <EB NAME="editSymbol" INDEX="1" CAPTION="Symbol: "
168                 TEXT="[GETQUOTE.edtSymbol]" MULTILINE="NO" SAVE="NO" SAVENAME="" X="2"
169                 Y="6" HT="16" WT="46" DATASRC="" FT="STRING" READONLY="YES"></EB>
170             <EB NAME="edtExchange" INDEX="0" CAPTION="Exchange: "
171                 TEXT="[GETQUOTE.chExch]" MULTILINE="NO" SAVE="NO" SAVENAME="" X="77"
172                 Y="177" HT="18" WT="0" DATASRC="" FT="STRING" READONLY="YES"></EB>
173         </EDITBOXES>
174     </SCREEN>
175     <SCREEN NAME="WAITSCREEN" TITLE="AIRIX(tm) Stock Ticker" ORDERED="FALSE">
176         <EVENTS>
177             <EVENT TYPE="DATA" NAME="RES">
178                 <ACTION TYPE="NOTIFY"></ACTION>
179                 <ACTION TYPE="OPEN" NAME="QUOTEDETAILS"
180                     NEWINST="TRUE"></ACTION>
181                 <ACTION TYPE="CLOSESCREEN" NAME="WAITSCREEN"></ACTION>
182             </EVENT>
183         </EVENTS>
184         <MENUS>
185             <MENU NAME="mnuWaitMenu" CAPTION="NewMenu0">
186                 <MENUITEM NAME="Cancel" CAPTION="Cancel" INDEX="0"
187                     READONLY="NO">
188                     <EVENTS>
189                         <EVENT TYPE="MENUITEMSELECTED">
190                             <ACTION TYPE="CLOSESCREEN"
191                                 NAME="WAITSCREEN"></ACTION>
192                         </EVENT>
193                     </EVENTS>
194                 </MENUITEM>
195             </MENU>
196         </MENUS>
```

APPENDIX B – EXEMPLARY APPLICATION DEFINITION DOCUMENT

```
197                <TEXTITEMS>
198                    <TI NAME="NewTextItem0" INDEX="0" CAPTION="Retrieving Quote
199                    Information," X="41" Y="15" HT="18" WT="0"></TI>
200                    <TI NAME="NewTextItem1" INDEX="1" CAPTION="Please Wait..." X="26"
201                    Y="31" HT="18" WT="0"></TI>
202                </TEXTITEMS>
203            </SCREEN>
204        </SCREENS>
205    </DEV>
206    </DEVICES>
207    </AXSCHDEF>
208 </ARML>
```

We claim:

1. A method of handling outgoing messages, said method comprising:
at a computing device:
receiving a document that defines an explicit format for outgoing messages, said format including delimiters for defining the beginning and end of a message generated according to said format;
generating, according to said format, a message;
generating a label for said message based on information provided in said document;
storing said message in a queue of outbound messages to be transmitted from said computing device;
storing said label in said queue of outbound messages such that the label is associated with said message;
upon receiving a request to display contents of said queue of outbound messages after unsuccessful transmission of the message, displaying said label to represent the presence of said message in said queue,
wherein said label is not transmitted with the message.

2. The method of claim 1 wherein said generating said label comprises:
receiving input; and
dynamically generating said label based on said input.

3. The method of claim 1 wherein said queue is a persistent data storage mechanism.

4. The method of claim 1 wherein said queue is a table in a relational database.

5. The method of claim 4 wherein storing said message comprises storing said message in a Message field in said table and said storing said label comprises storing said label in a Label field of said table, where said Label field is associated with said Message field.

6. The method of claim 5 further comprising:
receiving a request to display contents of said queue;
reading said label from said Label field associated with said Message field; and
displaying said label representative of presence of said message in said queue.

7. The method of claim 6 further comprising:
receiving input responsive to said displaying; and
based on said input, removing said message from said queue.

8. The method of claim 6 further comprising:
receiving input responsive to said displaying; and
based on said input, requesting attempted retransmission of messages in said queue.

9. The method of claim 1 wherein said document is written in a markup language.

10. The method of claim 9 wherein said format for messages is provided as part of a markup language element of said document.

11. The method of claim 10 wherein said information provided in said document comprises a value of an attribute of said markup language element.

12. The method of claim 11 wherein said generating said label comprises generating said label based on said value of said attribute of said markup language element.

13. The method of claim 12 wherein said generating said label further comprises incorporating user-input text, referenced by said value, in said label.

14. The method of claim 1 wherein said queue is a table in a relational database and said storing said message and said label in said queue comprises:
creating a message record that includes said message and said label; and
storing said message record in said table.

15. The method of claim 1 further comprising configuring said outgoing messages for transmission to an intermediate server, said outgoing messages including a payload for a further server.

16. The method of claim 1 wherein said label is used only when displaying the contents of the queue of outbound messages.

17. A computing device comprising:
a processor;
memory in communication with said processor, storing software adapting said device to:
receive a document that defines an explicit format for outgoing messages, said format including delimiters for defining the beginning and end of a message generated according to said format;
generate, according to said format, a message;
generate a label for said message based on information provided in said document;
store said message in a queue of outbound messages to be transmitted from said computing device;
store said label in said queue of outbound messages such that the label is associated with said message; and
upon receiving a request to display contents of said queue of outbound messages after unsuccessful transmission of the message, display said label to represent the presence of said message in said queue,
wherein said label is not transmitted with the message.

18. The computing device of claim 17 wherein said label is used only when displaying the contents of the queue of outbound messages.

19. A computer readable medium containing computer-executable instructions that, when performed by processor in mobile communication device, cause said processor to:
receive a document that defines an explicit format for outgoing messages, said format including delimiters for defining the beginning and end of a message generated according to said format;
generate, according to said format, a message;
generate a label for said message based on information provided in said document;
store said message in a queue of outbound messages to be transmitted from said mobile communication device;
store said label in said queue of outbound messages such that the label is associated with said message; and
upon receiving a request to display contents of said queue of outbound messages after unsuccessful transmission of the message, display said label to represent the presence of said message in said queue,
wherein said label is not transmitted with the message.

20. The computer-readable medium of claim 19 wherein said label is used only when displaying the contents of the queue of outbound messages.

* * * * *